(12) United States Patent
Heatherington

(10) Patent No.: US 12,465,712 B2
(45) Date of Patent: Nov. 11, 2025

(54) RESPIRATORY ASSEMBLY WITH CONDUIT ADAPTER AND METHODS OF USE

(71) Applicant: SNAP CPAP, LLC, Chapel Hill, NC (US)

(72) Inventor: Stuart Heatherington, Chapel Hill, NC (US)

(73) Assignee: SNAP CPAP, LLC, Chapel Hill, NC (US)

( * ) Notice: Subject to any disclaimer, the term of this patent is extended or adjusted under 35 U.S.C. 154(b) by 769 days.

(21) Appl. No.: 17/677,436

(22) Filed: Feb. 22, 2022

(65) Prior Publication Data

US 2022/0193360 A1    Jun. 23, 2022

Related U.S. Application Data

(63) Continuation of application No. PCT/US2020/053005, filed on Sep. 28, 2020.
(Continued)

(51) Int. Cl.
*A61M 16/06* (2006.01)
*A61M 16/16* (2006.01)

(52) U.S. Cl.
CPC ......... *A61M 16/0672* (2014.02); *A61M 16/16* (2013.01); *A61M 2205/02* (2013.01)

(58) Field of Classification Search
CPC .......... A61M 16/0672; A61M 16/0666; A61M 16/0825; A61M 16/0688; A61F 5/56
See application file for complete search history.

(56) References Cited

U.S. PATENT DOCUMENTS

| | | |
|---|---|---|
| 3,225,982 A | 12/1965 | Melton |
| 3,613,678 A | 10/1971 | Mayhew |

(Continued)

FOREIGN PATENT DOCUMENTS

| | | |
|---|---|---|
| CN | 102365108 B | 10/2015 |
| JP | 2006505373 A | 2/2006 |

(Continued)

OTHER PUBLICATIONS

JPO, Office Action for corresponding Japanese Patent Application No. 2022-502104, mailed Jan. 9, 2024, 9 pages (including English translation).

(Continued)

*Primary Examiner* — Kendra D Carter
*Assistant Examiner* — Maap Ellabib
(74) *Attorney, Agent, or Firm* — NK Patent Law

(57) ABSTRACT

Nasal respiratory assembly includes a pair of sheets. Each sheet defines an opening sized and shaped to fit over a nostril of a patient, with a ferromagnetic dome-shaped ring positioned at an underside of the sheet, with an upper side of the sheet configured for sealable engagement with the nostril. The assembly also includes a pair of posts. Each post includes a magnetic ring positioned at a first end and a ball shaped receptacle positioned at a second end. The magnetic ring is removably attachable to the dome-shaped ring. The assembly further includes a pair of conduit adapters with openings therethrough for fluid flow. A post end of each conduit adapter includes a socket, each socket shaped to receive the ball shaped receptacle in a ball and socket arrangement to form a substantially airtight connection therewith.

19 Claims, 14 Drawing Sheets

Related U.S. Application Data

(60) Provisional application No. 62/907,888, filed on Sep. 30, 2019.

(56) References Cited

U.S. PATENT DOCUMENTS

| | | | |
|---|---|---|---|
| 5,676,133 A | 10/1997 | Hickle et al. | |
| 5,752,510 A | 5/1998 | Goldstein | |
| 5,806,898 A | 9/1998 | Hollnagle | |
| 6,196,223 B1 | 3/2001 | Belfer et al. | |
| 6,408,850 B1 | 6/2002 | Sudge | |
| 7,229,516 B2 | 6/2007 | Busby | |
| 7,730,847 B1 | 6/2010 | Redd | |
| 8,887,725 B2 | 11/2014 | Hernandez et al. | |
| 9,517,317 B2 | 12/2016 | McAuley et al. | |
| 9,981,104 B1 | 5/2018 | Groll et al. | |
| 10,206,571 B2 | 2/2019 | Ewers et al. | |
| 10,265,493 B2 | 4/2019 | Heatherington et al. | |
| 2003/0047189 A1 | 3/2003 | Kumar | |
| 2004/0031490 A1 | 2/2004 | Haaga | |
| 2004/0139973 A1 | 7/2004 | Wright | |
| 2005/0205096 A1 | 9/2005 | Matula et al. | |
| 2006/0217665 A1* | 9/2006 | Prosek | A61B 17/3462 604/167.02 |
| 2006/0237017 A1 | 10/2006 | Davidson et al. | |
| 2007/0095348 A1 | 5/2007 | Fisher et al. | |
| 2007/0163600 A1 | 7/2007 | Hoffman | |
| 2010/0000534 A1 | 1/2010 | Kooij et al. | |
| 2010/0326441 A1* | 12/2010 | Zucker | A61M 15/085 128/207.18 |
| 2011/0067704 A1 | 3/2011 | Kooij et al. | |
| 2011/0253147 A1 | 10/2011 | Gusky et al. | |
| 2011/0297152 A1 | 12/2011 | Duveen | |
| 2013/0263858 A1 | 10/2013 | Ho et al. | |
| 2014/0090649 A1 | 4/2014 | Groll et al. | |
| 2015/0075530 A1 | 3/2015 | Collazo et al. | |
| 2015/0250972 A1 | 9/2015 | Haibach et al. | |
| 2015/0335846 A1 | 11/2015 | Romagnoli | |
| 2016/0022947 A1 | 1/2016 | Heatherington | |
| 2016/0317773 A1 | 11/2016 | Buddharaju | |
| 2017/0368291 A1* | 12/2017 | Heatherington | A61M 16/0493 |
| 2018/0021537 A1 | 1/2018 | Ging et al. | |
| 2018/0110945 A1 | 4/2018 | Cheng et al. | |
| 2018/0296785 A1 | 10/2018 | Heatherington | |
| 2019/0125998 A1 | 5/2019 | Baiko et al. | |
| 2019/0175863 A1 | 6/2019 | Hocking et al. | |
| 2020/0282167 A1 | 9/2020 | Aardema et al. | |

FOREIGN PATENT DOCUMENTS

| | | | | |
|---|---|---|---|---|
| JP | 2014000398 A | | 1/2014 | |
| JP | 2018530389 A | | 10/2018 | |
| KR | 101758652 B1 | | 7/2017 | |
| WO | 2011030250 A1 | | 3/2011 | |
| WO | 2012085758 A1 | | 6/2012 | |
| WO | WO-2014045245 A1 | * | 3/2014 | ............ A61M 16/06 |
| WO | 2017/062677 A1 | | 4/2017 | |

OTHER PUBLICATIONS

JPO, Office Action for corresponding Japanese Patent Application No. 2022-519753, mailed Mar. 5, 2024, 5 pages including translation.
EPO, Extended European Search Report for related European Patent Application No. 24172705.6, mailed Jun. 20, 2024, 5 pages.
EPO, Extended European Search Report for European Patent Application No. 21775939.8, dated Mar. 25, 2024, 12 pages.
ISA/KR, International Search Report and Written Opinion for corresponding PCT Patent Application No. PCT/US2020/053005, mailed Jan. 8, 2021, 13 pages.
WIPO, International Preliminary Report on Patentability for corresponding PCT Patent Application No. PCT/US2020/053005, dated Apr. 5, 2022, 6 pages.
EPO; Extended European Search Report for European Patent Application No. 20872801.4 dated Sep. 19, 2023, 5 pages.
USPTO, Final Office Action for U.S. Appl. No. 17/197,135, mailed Nov. 29, 2024, 15 pages.
JPO, Office Action for Japanese Patent Application No. 2024-062829, mailed Feb. 4, 2025, 6 pages (including translation).
JPO, Office Action for corresponding Japanese Patent Application No. 2022-556558, dated Sep. 17, 2024, 9 pages.
USPTO, Non-Final Office Action for corresponding U.S. Appl. No. 17/197,135, dated Aug. 9, 2024, 14 pages.
USPTO, Non-Final Office Action for corresponding U.S. Appl. No. 17/538,126, dated Nov. 14, 2024, 15 pages.
IP Australia, Examination Report for Australian Patent Application No. 2020311310, dated Apr. 16, 2025, 4 pages.
USPTO, Final Office Action for U.S. Appl. No. 17/538,126, dated May 21, 2025, 18 pages.

* cited by examiner

RESPIRATORY ASSEMBLY WITH CONDUIT ADAPTER AND METHODS OF USE

CROSS-REFERENCE TO RELATED APPLICATIONS

This application is a continuation application of International Application No. PCT/US20/53005 filed on Sep. 28, 2020, which claims priority to U.S. Provisional Patent Application 62/907,888 filed on Sep. 30, 2019, the contents of which is hereby incorporated by reference in its entirety.

TECHNICAL FIELD

The presently disclosed subject matter relates to a respiratory assembly, and particularly to a respiratory nasal assembly for engaging the nostrils of a person.

BACKGROUND

Facial masks and nasal cannula are typically used for treating individuals with sleeping and breathing disorders. High flow of respirator gas can be delivered to an individual through a nasal cannula and/or a facial mask. Similarly, fluid such as ambient air or oxygen-enriched air can be delivered through a continuous positive airway pressure (CPAP) masks to a patient under a predetermined or desired pressure setting.

CPAP Masks and cannula that currently exist in the market are typically bulky, making them less aesthetically pleasing and less ergonomically effective. Further, conventional masks and cannula must provide sealable engagement with the patient's skin, leaving unsightly wear marks that require significant amounts of time to dissipate. The depressions or marks result from both the ridges of the mask enveloping the mouth and/or the nostril and from the straps or connections positioned about the individual's head. Due to the bulky nature of conventional CPAP masks and cannula, the ability of the wearer to move his/her head during sleep is constrained. For example, when the wearer of a conventional CPAP mask lies on her side during sleep, the wearer's pillow can contact and dislodge the mask, thereby evacuating the pressure within the mask assembly. As a result, the wearer wakes up or otherwise does not receive treatment gases under the ideal pressure.

Accordingly, there is a need for an improved respiratory assembly that addresses the disadvantages associated with conventional CPAP masks.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a nasal respiratory assembly. According to various embodiments, the assembly includes a pair of sheets, each sheet defining an opening sized and shaped to fit over a nostril of a patient, with a ferromagnetic dome-shaped ring positioned at an underside of the sheet and circumferentially aligned with the opening, with an upper side of the sheet configured for sealable engagement with the nostril. A pair of posts are provided, each post including a magnetic ring positioned at a first end and a ball shaped receptacle positioned at a second end with a passageway extending from the first to the second ends, the magnetic ring removably attachable to the dome-shaped ring. A pair of conduit adapters defining openings therethrough for fluid flow are provided; a post end of each conduit adapter including a socket, each socket shaped to receive the ball shaped receptacle in a ball and socket arrangement to form a substantially airtight connection therewith. a connector end of the conduit adapter cooperates with a channel opening of a connector of a continuous positive airway pressure (CPAP) machine to form a substantially airtight connection therewith.

According to one or more embodiments, each receptacle is configured to form an interference fit with the socket of the conduit adapter.

According to one or more embodiments, the connector end of the conduit adapter encircles the channel opening of the connector to form an interference fit.

According to one or more embodiments, the channel opening of the connector stretches over and encircles the connector end of the conduit adapter to form an interference fit.

According to one or more embodiments, an interior of the conduit adapter defines an approximate cylindrical opening.

According to one or more embodiments, an exterior of the conduit adapter has an approximate hour-glass shape.

According to one or more embodiments, the conduit adapter comprises an elastomeric material or low-density polyethylene (LDPE).

According to one or more embodiments, the assembly lacks straps, masks, or both.

According to one or more embodiments, the fluid is selected from a gas, a mixture of gases, or a gas with a medication.

According to one or more embodiments, a wall thickness of the conduit adapter varies along a height of the conduit adapter.

According to one or more embodiments, a flexibility of the conduit adapter material varies along a height of the conduit adapter.

According to one or more embodiments, a wall thickness of the conduit adapter increases progressively moving from ends of the conduit adapter towards the mid-height section of the conduit adapter.

According to one or more embodiments, an upper surface of the post is angled.

According to one or more embodiments, an opening of the magnetic ring has a round, oblong, oval or tear drop shape, wherein the shape of an opening of the dome-shaped ring compliments the shape of an opening of the magnetic ring.

According to one or more embodiments, an inlet at a vent end of the connector is in fluid communication with a flexible tubing connected to a fluid source.

According to one or more embodiments, the connector is part of a generic off-the-shelf continuous positive airway pressure (CPAP) machine.

According to one or more embodiments, the fluid is supplied from a high flow generator, a continuous positive airway pressure (CPAP) machine, a fluid tank, or a humidifier.

Disclosed herein is a nasal respiratory assembly. According to one or more embodiments, the assembly includes a pair of sheets, each sheet defining an opening sized and shaped to fit over a nostril of a patient, with a ferromagnetic ring positioned at an underside of the sheet and circumferentially aligned with the opening, with an upper side of the sheet configured for sealable engagement with the nostril. The assembly further includes a pair of posts, each post including a magnetic ring positioned at a first end and a receptacle positioned at a second end with a passageway extending from the first to the second ends, the magnetic ring removably attachable to the ferromagnetic ring. The assembly also includes a pair of conduit adapters defining openings therethrough for fluid flow, a post end of each conduit adapter including a socket, each socket shaped to receive the receptacle in an interference fit to form a substantially airtight connection therewith. A connector end of the conduit adapter cooperates with a channel opening of a connector of a continuous positive airway pressure (CPAP) machine to form a substantially airtight connection therewith.

According to one or more embodiments, an interior of the conduit adapter defines an approximate cylindrical opening.

According to one or more embodiments, an exterior of the conduit adapter has an approximate hour-glass shape.

According to one or more embodiments, the conduit adapter comprises an elastomeric material.

According to one or more embodiments, the assembly lacks straps, masks, or both.

According to one or more embodiments, an opening of the magnetic ring has a round, oblong, oval or tear drop shape, wherein the shape of an opening of the ferromagnetic ring compliments the shape of an opening of the magnetic ring.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
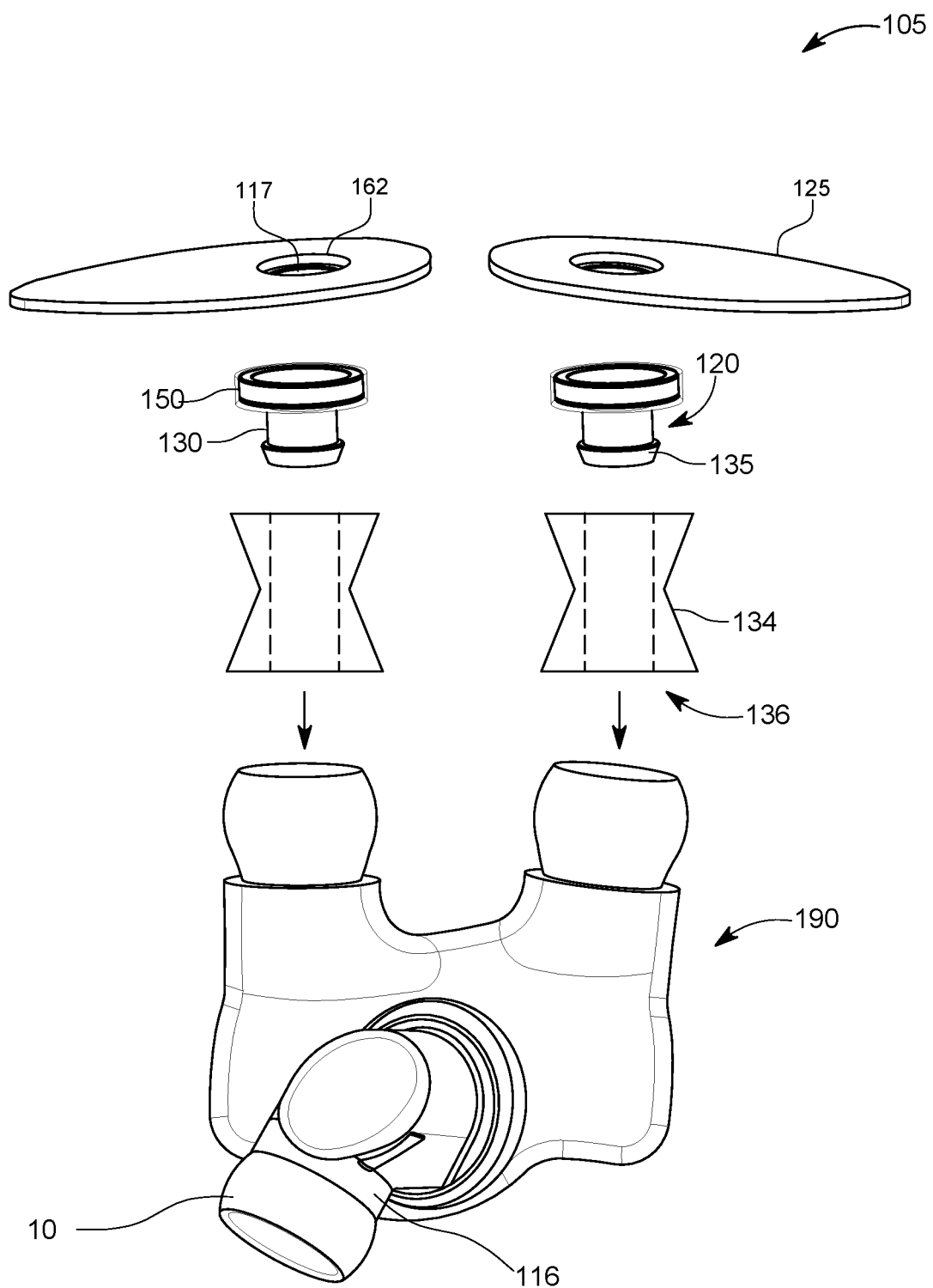
FIG. 1 is a schematic view of various components of a nasal respiratory assembly, in accordance with some embodiments of the presently disclosed subject matter.
Figure 2:
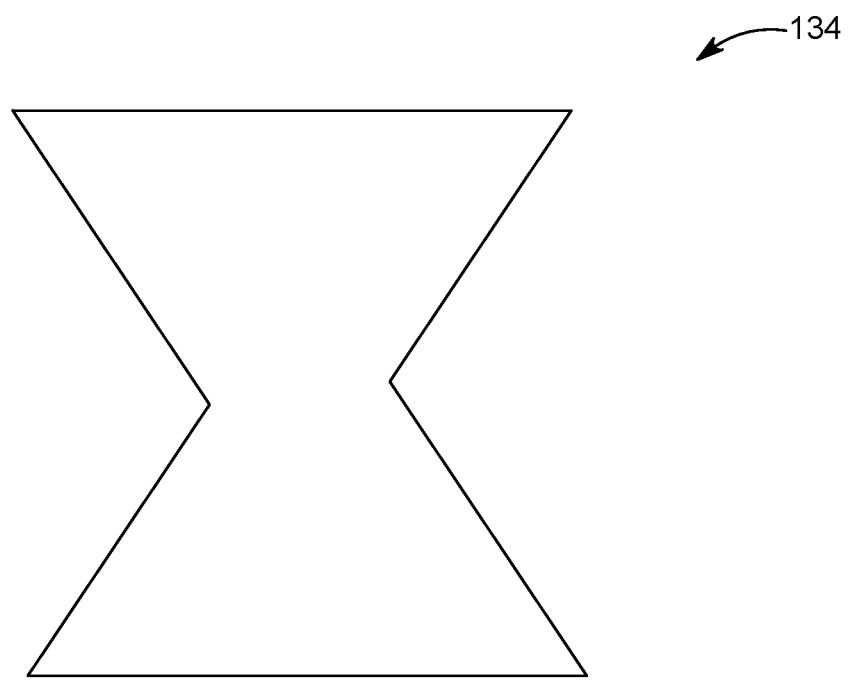
FIG. 2 is a schematic view of a conduit adapter forming part of of the nasal respiratory assembly, in accordance with some embodiments of the presently disclosed subject matter.
Figure 3:
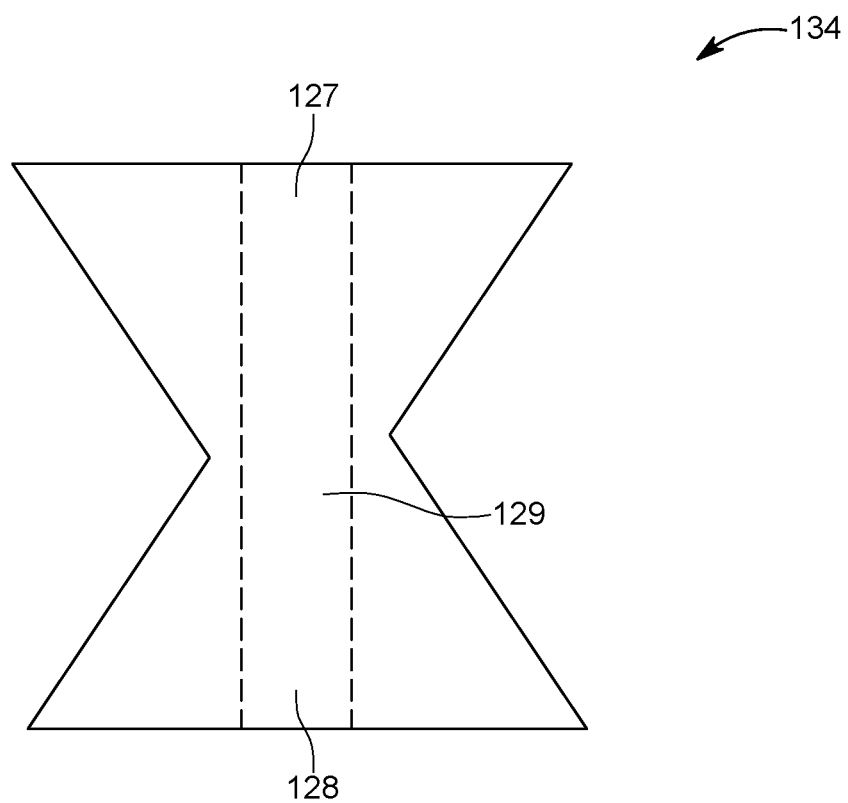
FIG. 3 is a cross-section view of the conduit adapter of FIG. 2, in accordance with some embodiments of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description of The Embodiments section explicitly defines such terms. Accordingly, the actual scope of the disclosure encompasses not only the disclosed embodiments, but also all equivalent ways of practicing or implementing the disclosure under the claims.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As noted earlier, CPAP Masks and cannula that currently exist in the market are typically bulky, making them less aesthetically pleasing and less ergonomically effective. In recent times, mask-less respiratory assemblies that are typically more comfortable for patient use have recently become available in the marketplace. However, the sunk cost associated with the investment made in purchasing a conventional CPAP mask may prevent some patients from converting to these newly available mask-less CPAP respiratory assemblies.

Embodiments of the presently disclosed subject matter advantageously provide for an adapter that can allow for modifying any existing conventional CPAP respiratory assembly that includes a mask, with the modification resulting in the elimination of the need for a mask as well as the associated strap that secures the mask to a patient's face. According to various embodiments of the presently disclosed subject matter, a pair of conduit adapters are provided. The conduit adapters advantageously provide for the modification of most existing conventional CPAP respiratory assemblies that includes a mask by eliminating the need for the mask as well as the strap that secures the mask to a patient's face. According to at least one embodiment, each of the conduit adapters as disclosed herein can be inserted into one of two complimenting channel openings provided in any or most conventional nasal pillow CPAP (continuous positive airway pressure) mask available on the market. In various embodiments, the silicone or other stretchable material of the nasal pillow mask can be stretched over the conduit adapter to create a seal, therefore, converting that "other brand of mask" into a new magnetic maskless CPAP device as will be explained hereinafter. This can advantageously permit other existing mask-based CPAP devices to be modified into maskless CPAP devices, wherein each of such modified maskless CPAP device is provided with a magnetic attachment/detachment mechanism (instead of straps) for attaching the CPAP device and supplying fluid from the CPAP device to the nares of a user. In at least one embodiment, each conduit adapter is configured for jamming down into the two openings of any existing nasal pillow CPAP mask available on the market, whereby the silicone or similar stretchable material extends over, and encircles one end of the hourglass shaped conduit adapter to create a seal, therefore, converting that "other brand of mask" into a new magnetic mask to be used with tape based metal/magnetic ring attachment setup as will be described herein.

Embodiments of the presently disclosed subject matter can accordingly advantageously eliminate the need for a mask (as well as the need for the straps needed for securing the mask to a user's face) as found in existing CPAP devices. Embodiments of the presently disclosed subject matter can advantageously allow an user to modify the user's existing mask CPAP device through a DIY (Do it Yourself) project by cutting off the headgear of the CPAP nasal pillow cushion and turning it into a magnetic attachment/detachment system (that does not require a mask or straps) merely by inserting one end of each conduit adapter disclosed herein down into each of the two channel openings of CPAP nasal pillow cushion, the two channel openings resulting from the cutting off of the headgear of the CPAP nasal pillow cushion.

According to some alternate embodiments, the stretchable material of the conduit adapter can be stretched over the channel opening of the nasal pillow mask. Aspects of the invention will now be described with reference to the drawings.

Embodiments of the presently disclosed subject matter are directed to a respiratory assembly. The figures provided herein illustrate one or more embodiments of a nasal assembly capable of being installed upon a patient according to one or more embodiments of the presently disclosed subject matter. According to at least one embodiment, nasal respiratory assembly 105 illustrated in FIG. 1 comprises a pair of sheets 125. Each sheet 125 defines an opening sized and shaped to fit over a nostril of a patient, with a ferromagnetic ring 162 (in some embodiments the ferromagnetic ring may be dome shaped; see dome-shaped ferromagnetic ring 262, for example) positioned at an underside of the sheet and circumferentially aligned with the opening. An upper side of the sheet configured for sealable engagement with the nostril. Nasal respiratory assembly 105 further includes a pair of port magnet posts 120, each post including a magnetic ring 150 positioned at magnet socket 152 at a first end, and a ball shaped receptacle 135 positioned at a second end with a passageway extending from the first to the second ends, the magnetic ring 150 removably attachable to the ferromagnetic ring 162. Nasal respiratory assembly 105 further includes a pair of conduit adapters 134 with openings therethrough for fluid flow. A post end of each conduit adapter 134 includes a post end socket 127. Each post end socket 127 is shaped to receive the ball shaped receptacle 135 in a ball and socket arrangement to form a substantially airtight connection therewith. A connector end 128 of the conduit adapter cooperates with a channel opening 115 of a connector of a continuous positive airway pressure (CPAP) machine to form a substantially airtight connection therewith. The ball shaped receptacle 135 is configured to pivotably move or rotate about an inner surface of post end socket 127 while still maintaining a substantially airtight connection therewith.

According to one or more embodiments, each ball shaped receptacle 135 is configured to form an interference fit with the post end socket 127 of conduit adapter 134. In some embodiments, the connector end 128 of the conduit adapter encircles the channel opening 115 of nasal connector 190 (nasal connector 190 forms part of a generic CPAP device) to form an interference fit. In some alternate embodiments, the channel opening 115 of nasal connector 190 forming part of a generic CPAP device is stretched over and encircles the connector end 128 of conduit adapter 134 to form an interference fit. Typically, the channel opening regions of connector present in nasal pillow CPAP devices available in the market are made of stretchable materials such as, for example, silicone. The silicone material can be stretched over the connector end 128 of conduit adapter 134 in some embodiments; in some alternate embodiments, the connector end 128 of the conduit adapter (the conduit adapter, at least in the region of the connector end 128 is made of a stretchable material) can be stretched to encircle the channel opening 115 of nasal connector 190. The flexible or stretchable material of the channel opening region of the nasal connector can facilitate a substantially airtight fit with the stretchable (or flexible) material of the conduit adapter in general, and particularly with the connector end region of the conduit adapter.

In some embodiments, an interior of the conduit adapter has an approximate cylindrical opening. In at least one embodiment, an exterior of the conduit adapter has an approximate hourglass shaped opening. In at least one embodiment, an exterior as well as an interior of the conduit adapter has an approximate hourglass shaped opening. However, any other suitable shape may be provided for the interior of the conduit adapter. For example, in one embodiment, post end socket portion of the opening may be shaped to compliment the shape of ball shaped receptacle 135. In one embodiment, post end socket portion of the opening may be shaped to compliment the shape of ball shaped receptacle 135 and further form an interference fit therewith. In some embodiments, the thickness of the wall of the conduit adapter may vary along the height of the conduit adapter. For example, in some embodiments, a thickness of the wall of the conduit adapter is greater at the ends of the conduit adapter with the thickness progressively decreasing as one proceeds from the ends towards the mid-section of the height of the conduit adapter. Similarly, the flexibility of the wall can also vary along the height of the conduit adapter; in one embodiment, the end regions of conduit adapter 134 can be more flexible as compared to the mid-section region of conduit adapter 134. In one embodiment, the mid-section region can be more flexible as compared to one or more end regions. Particularly, the thickness and the flexibility of the connector end region of the conduit adapter, the inside shape of the opening at the connector end region, and/or the external contour of the conduit adapter at or near the connector end region may be configured to suitably fit the channel openings 115 of the various nasal connectors available in the market. For example, in some embodiments, an exterior surface of the conduit adapter can have an approximate hour-glass shape with a brim provided at the connector end, with the brim including a rim that circumferentially extends inward into the opening for improving the grip on the connector opening inserted into the opening at the connector end of the conduit adapter. In some embodiments, an exterior surface of the conduit adapter can include a brim provided at the connector end, with the brim including a rim that circumferentially extends outwards for improving the grip on the connector opening when the connector end is inserted into channel opening. In some embodiments, the inner surfaces and/or the outer surfaces of conduit adapter 134 or portions thereof may be coated with a glue material in order to form an airtight bond with the channel opening 115 and/or the openings of the ball shaped receptacle. In some embodiments, the bond formed by the glue material is permanent, whereas in other embodiments, the bond may be detachable/temporary albeit requiring considerable effort to detach the bond.

In various embodiments, the conduit adapter can be made of an elastomeric material. In some embodiments, at least some portion of the conduit adapter can be made of an elastomeric material. In some other embodiments, the whole of the conduit adapter can be made of low-density polyethylene (LDPE). Accordingly, in various embodiments, the nasal assembly including a conduit adapter as described herein can advantageously eliminate the need for straps, masks, or both. The generic CPAP device that the conduit adapter is attached may be supplied with a fluid selected from a gas, a mixture of gases, or a gas with a medication.

FIG. 1 accordingly illustrates a nasal respiratory assembly such as nasal respiratory assembly 105 capable of being installed upon a patient according to one or more embodiments of the presently disclosed subject matter. As shown, the nasal respiratory assembly includes sheets 125 that are configured to engage the nares (i.e., nostrils) of the patient. The nasal respiratory assembly also includes socket magnet posts such as port magnet posts 120. One end of each port magnet post 120 is configured to removably attach to a ferromagnetic ring 162 on sheet 125 through the presence of a magnetic field; the other end of each port magnet post 120 is configured to engage an opening of conduit adapter 134. In various embodiments, each port magnet post 120 can represent a socket magnet post. In one embodiment, ferromagnetic ring 162 is a permanent magnet. Nasal respiratory assembly 105 accordingly includes a pair of conduit adapters 134 with openings therethrough for fluid flow, a post end of each conduit adapter 134 including a post end socket 127, each post end socket 127 shaped to receive the ball shaped receptacle 135 in a ball and socket arrangement to form a substantially airtight connection therewith. A connector end 128 of the conduit adapter cooperates with a channel opening 115 of a connector of a continuous positive airway pressure (CPAP) machine to form a substantially airtight connection therewith.

Figure 4:
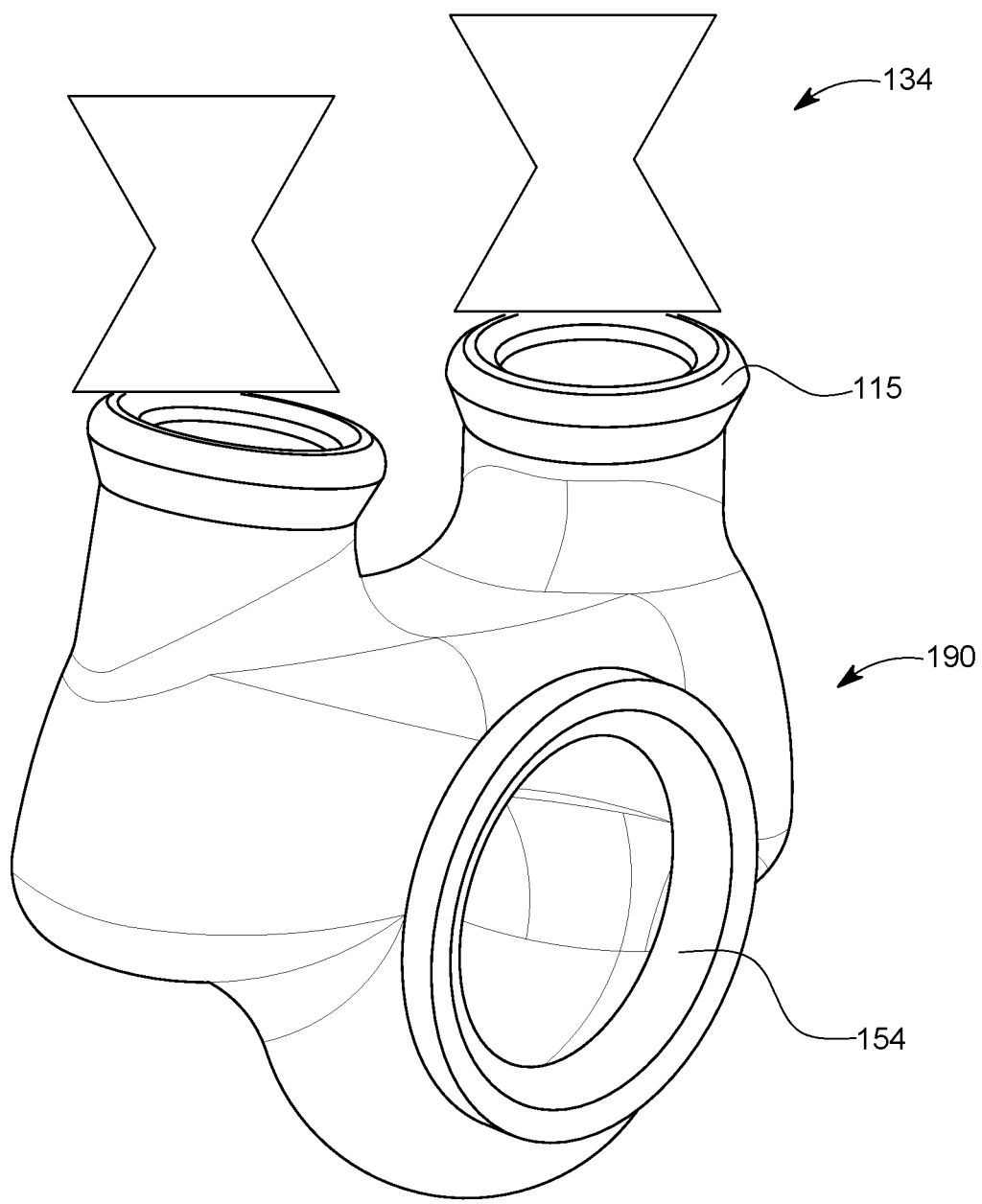
FIG. 4 is a perspective view of a nasal connector that can be used with the disclosed nasal respiratory assembly in some embodiments along with a pair of conduit adapters, in accordance with some embodiments of the presently disclosed subject matter.

FIG. 4 illustrates a nasal connector 190 that includes a pair of channel openings 115 at a post end and an inlet such as vent coupling 154 at a vent end that is fluid communication with a flexible tubing connected to a fluid source. In some embodiments, as illustrated in FIG. 4, for example, vent coupling 154 may be positioned on a side surface of the nasal connector 190 (as opposed to being provided on a bottom surface of the nasal connector). In various embodiments, nasal connector 190 of nasal respiratory assembly 105 can represent any generic nasal connector available in the market. As is common of most nasal connectors, nasal connector 190 can includes a pair of channel openings 115. Connector end 128 of conduit adapter 134 is sized and shaped to cooperate with each channel opening 115 to form a substantially airtight connection therewith such that channel 136 of port magnet post 120 is aligned with channel opening 115 of nasal connector 190 through conduit adapter opening 129, and an inlet such as vent coupling 154 at a vent end that is configured for fluid communication with a flexible tubing connected to a fluid source. In one embodiment, a vent such as vent 170 may be located between vent coupling 154 and the flexible tubing. Vent 170 can include vent receptacle 198 sized and shaped to cooperate with vent coupling 154 to form a substantially airtight connection therewith, and an inlet such as inlet 138 sized and shaped to cooperate with a flexible tubing to form a substantially airtight connection therewith.

Figure 5A:
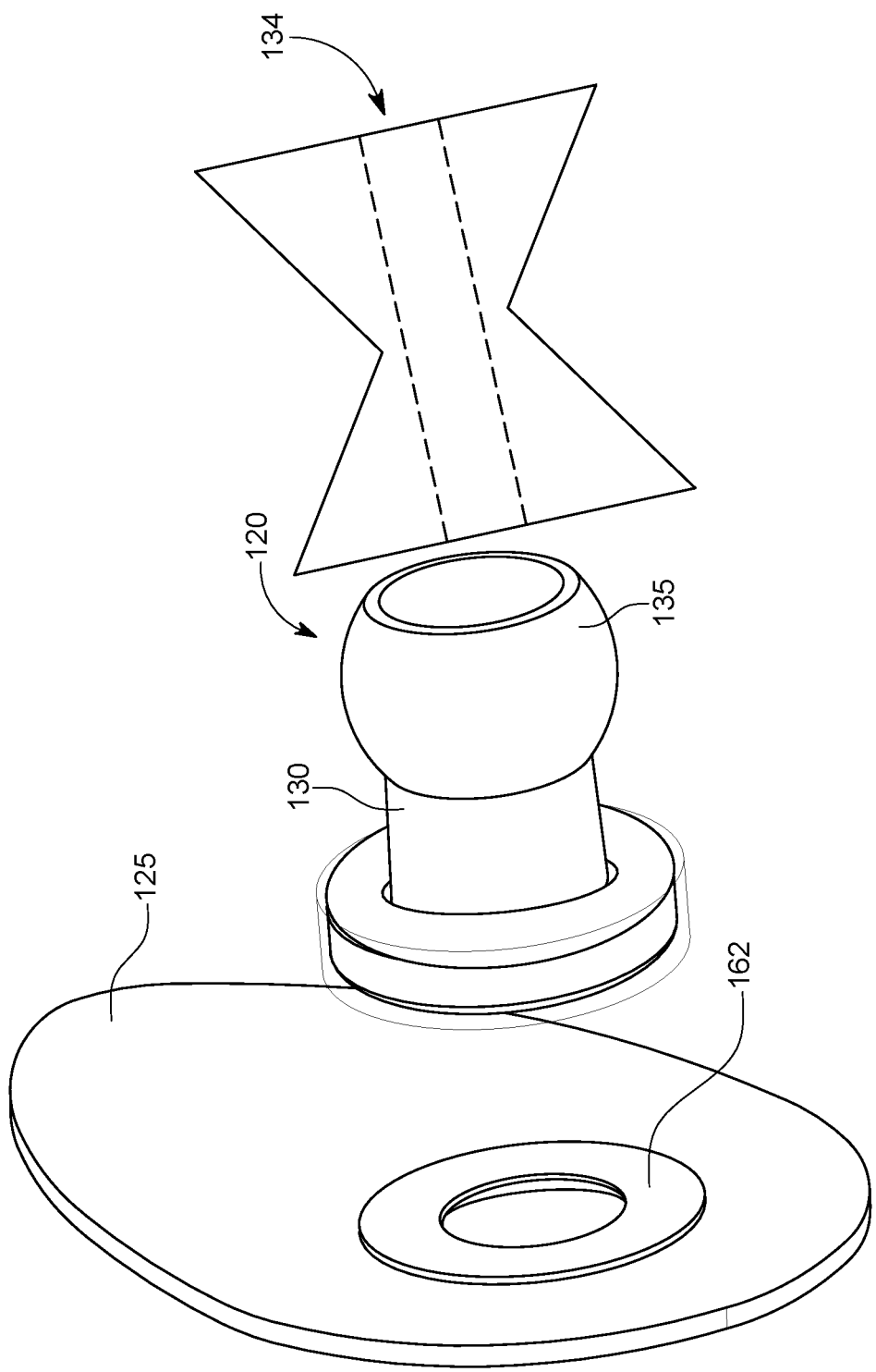
FIG. 5A is a perspective views of a sheet and a port magnet post along with a conduit adapter that can be used with the disclosed nasal respiratory assembly.
Figure 5B:
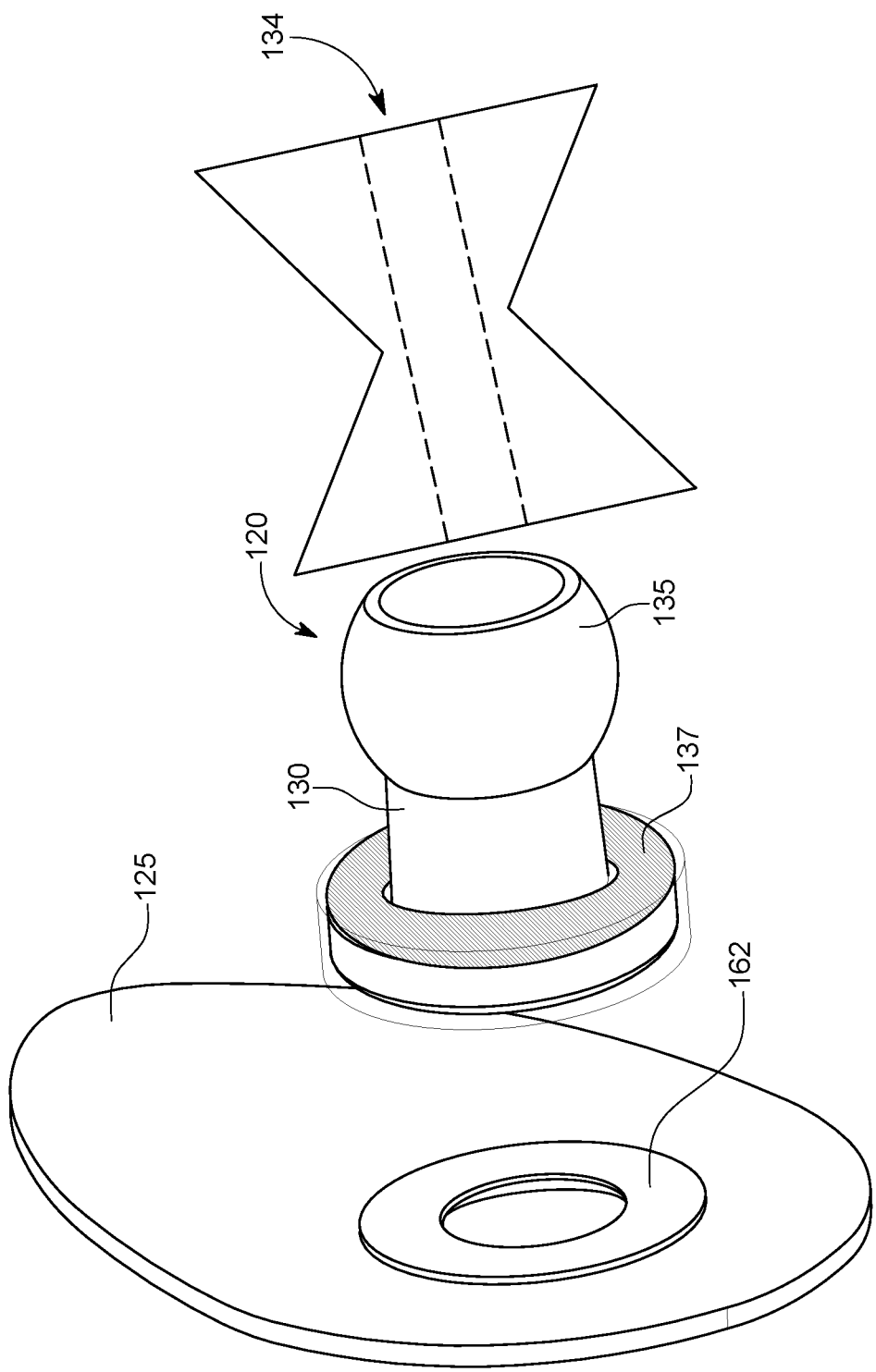
FIG. 5B is a perspective view of a sheet and a port magnet post including an additional ball and socket arrangement along with a conduit adapter that can be used with the nasal respiratory assembly, in accordance with some embodiments of the presently disclosed subject matter.

FIGS. 5A and 5B illustrate additional features of the nasal respiratory assembly, According to one or more embodiments, nasal respiratory assembly 105 includes a pair of sheets 125, each sheet defining an opening 117 sized and shaped to fit over the nostril of a patient, with a ferromagnetic ring 162 (see FIG. 5A, for example) positioned at an underside of the sheet and circumferentially aligned with the opening, with an upper side of the sheet configured for sealable engagement with the nostril. Sheets 125 are configured to engage the nares (i.e., nostrils) of the patient. The nasal assembly also includes port magnet posts 120. In some embodiments, one end of each port magnet post 120 is configured to removably attach to a ferromagnetic ring 162 on sheet 125 through the presence of a magnetic field; the other end of each port magnet post 120 is configured to engage an opening of nasal connector 190.

As illustrated in FIG. 5A, each port magnet post 120 includes a magnetic ring 150 positioned at a first end and a ball shaped receptacle 135 positioned at a second end with a passageway extending from the first to the second ends, the magnetic ring 150 removably attachable to the ferromagnetic ring 162. Ferromagnetic ring 162 can have a substantially flat major surface facing port magnet post 120, as shown, for example, in FIG. 5A. Further, port magnet post 120 of nasal respiratory assembly 105 can include a ball shaped receptacle 135 that cooperates with post end socket 127 of conduit adapter. The ball shaped receptacle 135 is configured to pivotably move or rotate about an inner surface of post end socket 127 while still maintaining a substantially airtight connection therewith. Connector end 128 of conduit adapter 134 is configured to cooperate with channel opening 115 of nasal connector 190 (nasal connector can be any generic nasal connector available in the market). Ferromagnetic ring 162 having a substantially flat major surface can allow for a sliding movement of magnetic ring 150 across ferromagnetic ring 162 to enable a convenient disconnect mechanism. In one embodiment wherein ferromagnetic ring 162 is itself a permanent magnet (rather than ferromagnetic ring 162 being formed of a material that magnetic ring 150 attracts), the polarity of magnetic ring 150 exhibits a pull or push magnetic force against ferromagnetic ring 162 depending on the polarity of the corresponding ferromagnetic ring 162. This pull or push force can be advantageously designed for the convenient connecting or disconnecting of ferromagnetic ring 162 to/from magnetic ring 150.

Magnetic ring 150 removably attaches to the ferromagnetic ring 162 at an exit end of port magnet post 120. In one embodiment, magnetic ring 150 is configured to move or rotate about the surface of ferromagnetic ring 162 while continuing to maintain a substantially airtight connection at the interface between magnetic ring 150 and ferromagnetic ring 162. The ferromagnetic ring 162 can thus advantageously prevent or reduce the possibility of the nasal connector 190 from inadvertently getting dislodged when the wearer of the nasal respiratory assembly 105 moves the head either when awake or sleeping to thereby allowing for the continued supply of treatment gases to a patient's (or wearer's) nare under ideal pressure. In at least one embodiment, the ferromagnetic ring 162 can permit magnetic ring 150 to move or rotate about the surface of ferromagnetic ring 162 while continuing to maintain a substantially airtight connection therewith when the face of a patient wearing nasal respiratory assembly 105 is moved in a sudden jerky movement. In at least one embodiment, the ferromagnetic ring 162 can permit magnetic ring 150 to move or rotate about the surface of ferromagnetic ring 162 while continuing to maintain a substantially airtight connection therewith when the wearer's pillow contacts or applies a shearing force against a portion of the nasal respiratory assembly 105 or against the tubing supplying fluid to the nasal respiratory assembly 105.

In an alternate embodiment, as shown, for example in FIG. 5B, port magnet post 120 includes an additional ball and socket arrangement 137 positioned directly below magnetic ring 150, with ball and socket arrangement 137 being arranged between magnetic ring 150 and at or near an upper end (i.e., at a sheet 125 facing end) of post body 130. The ball and socket arrangement 137 offers a pivoting head for magnetic ring 150 to receive the ferromagnetic ring 162 at different pitches and angles for nares that flare on the outside of the nose, with each ball and socket arrangement 137 providing for the respective magnetic ring 150 to pivot from angles 0-90 degrees relative to the upper end (i.e., at a sheet 125 facing end) of post body 130. Accordingly, as a person of skill in the art would understand, the ball and socket arrangement 137 is configured to pivotably move or rotate about an inner surface of a suitable cooperating socket arrangement provided at or near the upper end of post body 130 while still maintaining a substantially airtight connection therewith. In other words, the ball and socket arrangement 137 operates similar to how ball shaped receptacle 135 that cooperates with channel opening 115 of nasal connector 190 in a ball and socket arrangement in nasal respiratory assembly 105. The ball and socket arrangement 137 further operates similar to how ball shaped receptacle 135 that cooperates with an inner surface of post end socket 127 in a ball and socket arrangement.

In some embodiments, an upper surface of each port magnet post 120 may be angled to provide better fit with the sheet 125 attached to various nares. In various embodiments, the opening of the magnetic ring can have a round, oblong, oval or tear drop shape; the shape of the opening of the dome-shaped ring can accordingly compliment the shape of an opening of the magnetic ring.

Figure 6:
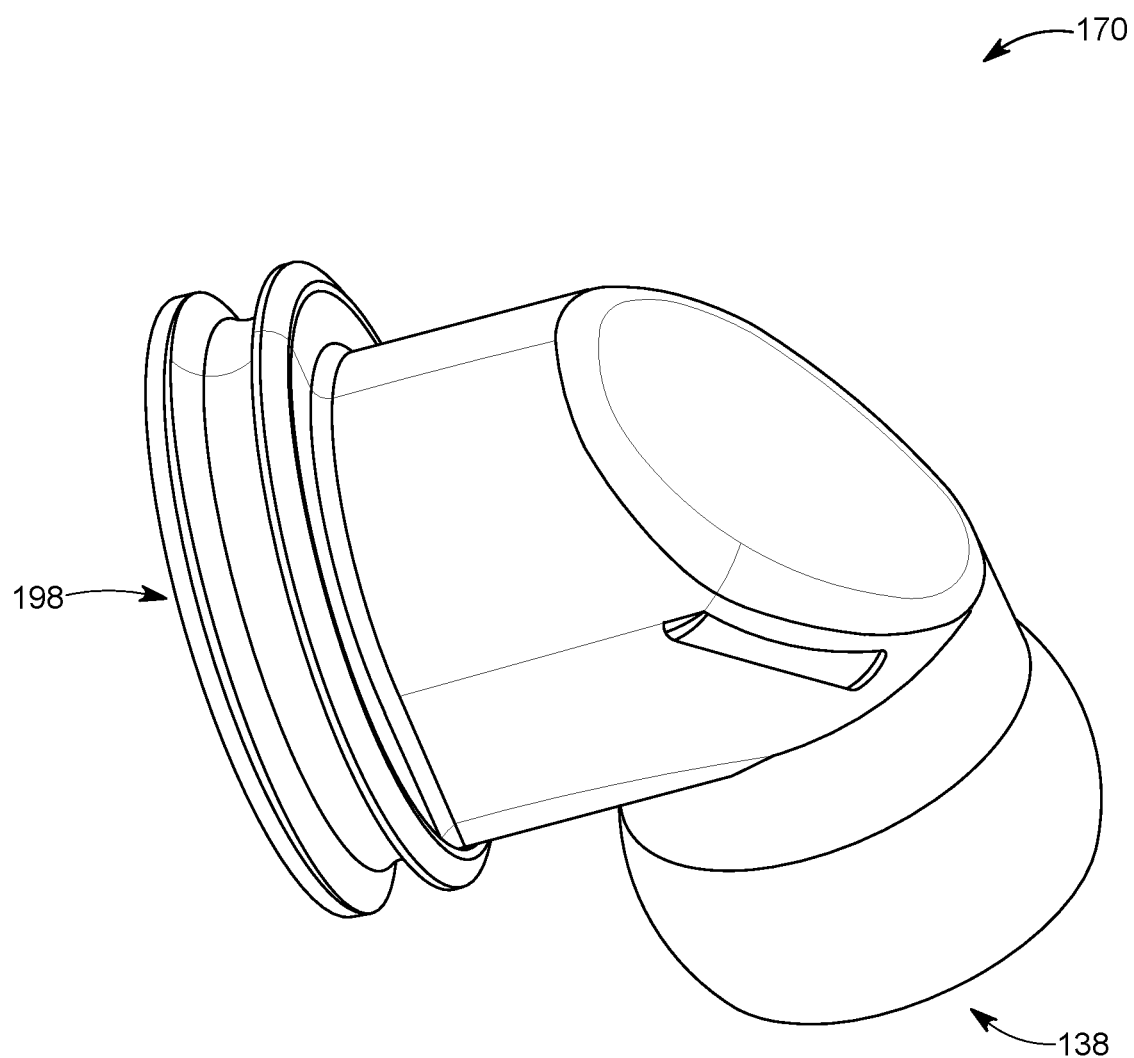
FIG. 6 is a perspective view of a vent that can be used with the nasal respiratory assembly, in accordance with some embodiments of the presently disclosed subject matter.
Figure 7:
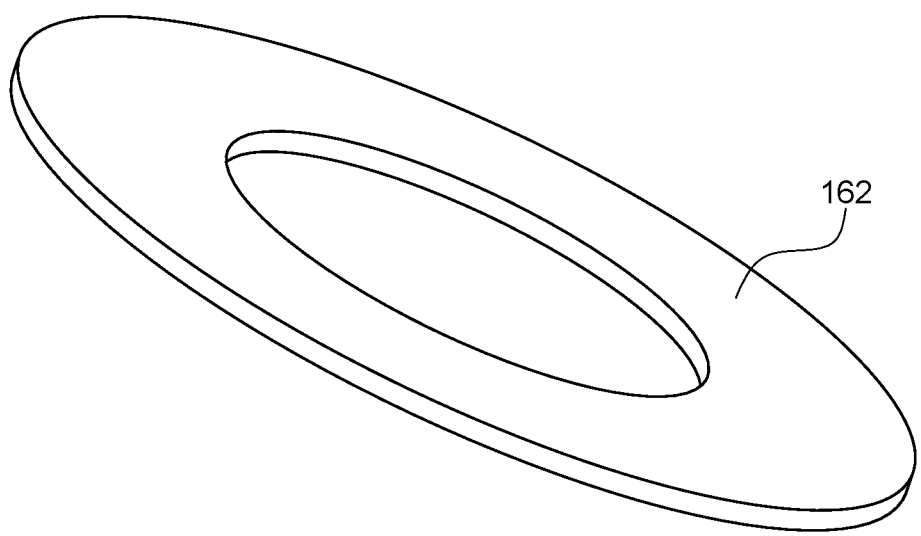
FIG. 7 is a perspective view of a ferromagnetic ring that can be used with the nasal respiratory assembly, in accordance with some embodiments of the presently disclosed subject matter.

FIG. 6 illustrates a vent that can form part of the nasal respiratory assembly. Nasal respiratory assembly 105 can accordingly further include at least one vent 170 for receiving treatment gases to the nasal cavity of a patient. One end of vent 170 can have an inlet 138 configured for connecting to a fluid source (not shown) via a fluid tubing that provides the respiratory gas, while vent receptacle 198 located at the other end of vent 170 engages vent coupling 154 of nasal connector 190. Accordingly, nasal respiratory assembly 105 can include one or more vents 170 positioned proximal to where fluid flow occurs. It should be appreciated that vent 170 can be positioned at any desired location and are not limited to the locations illustrated herein. In some embodiments, vent 170 can include a socket including a further adapter. The further adapter can be constructed in any desired shape to allow connection with a flexible tube or tubing. In such embodiments, the outer diameter of the adapter is greater than the inner diameter of the tube or tubing. In this way, the further adapter is held within the tubing for a desired amount of time, and cannot be accidentally unlodged by the patient, such as during sleep. However, the adapter can be releasably connected to the tubing using any known mechanism. Accordingly, in various embodiments, an inlet at a vent end of the connector is in fluid communication with a flexible tubing connected to a fluid source. Further, the connector can be part of a generic off-the-shelf continuous positive airway pressure (CPAP) machine. Furthermore, the fluid can be supplied from a high flow generator, a continuous positive airway pressure (CPAP) machine, a fluid tank, or a humidifier. However, it is to be noted that, besides channel openings 115, it is not a requirement that the other elements of the nasal respiratory assembly 105 upstream of channel openings 115 as mentioned above (i.e., all elements between channel openings 115 and the fluid source as mentioned above) be arranged in the manner described above for the invention to operate as intended. In other words, beyond two channel openings 115, the remaining elements of nasal respiratory assembly 105 upstream of channel openings 115 may have any suitable or desirable configuration(s).

In some embodiments, the fluid source can be a high flow generator, a continuous positive airway pressure (CPAP) machine, a fluid tank, a humidifier, or any other fluid source known or used in the art. The term "fluid" as used herein refers to any gas, mixture of gases, or gas with medication (such as an aerosol medication) suitable for delivery to the airway of a human. As illustrated in FIG. 1, for example, a flexible tubing can couple with inlet 138 to supply the fluid from the fluid source, the tubing can include any known flexible tubing. The term "tubing" as used herein refers to any conduit, a delivery conduit, a tube, pipe, passage, or channel through which fluid flows. The term "flexible" as used herein refers to any tubing that is able to flex or bend and that is compliant and will readily conform to the general shape and contours of the human body. In some embodiments, the tubing can be constructed from medical grade materials, such as (but not limited to) polyurethane, polyvinyl chloride, polyamide, polyester, polyolefin, silicone, fluoropolymer, and combinations or copolymers thereof. The tubing is flexible, resilient, and hollow. In some embodiments, the tubing can have an inner diameter of between about 2-4 mm, although tubing with larger or smaller diameters can be used. For example, the inner diameter of the tubing can be increased or decreased to adjust for a particular wearer's preferences and/or needs. In some embodiments, during use, tubing can be hooked over the ears of a patient and can be brought up under the chin during use.

Figure 8:
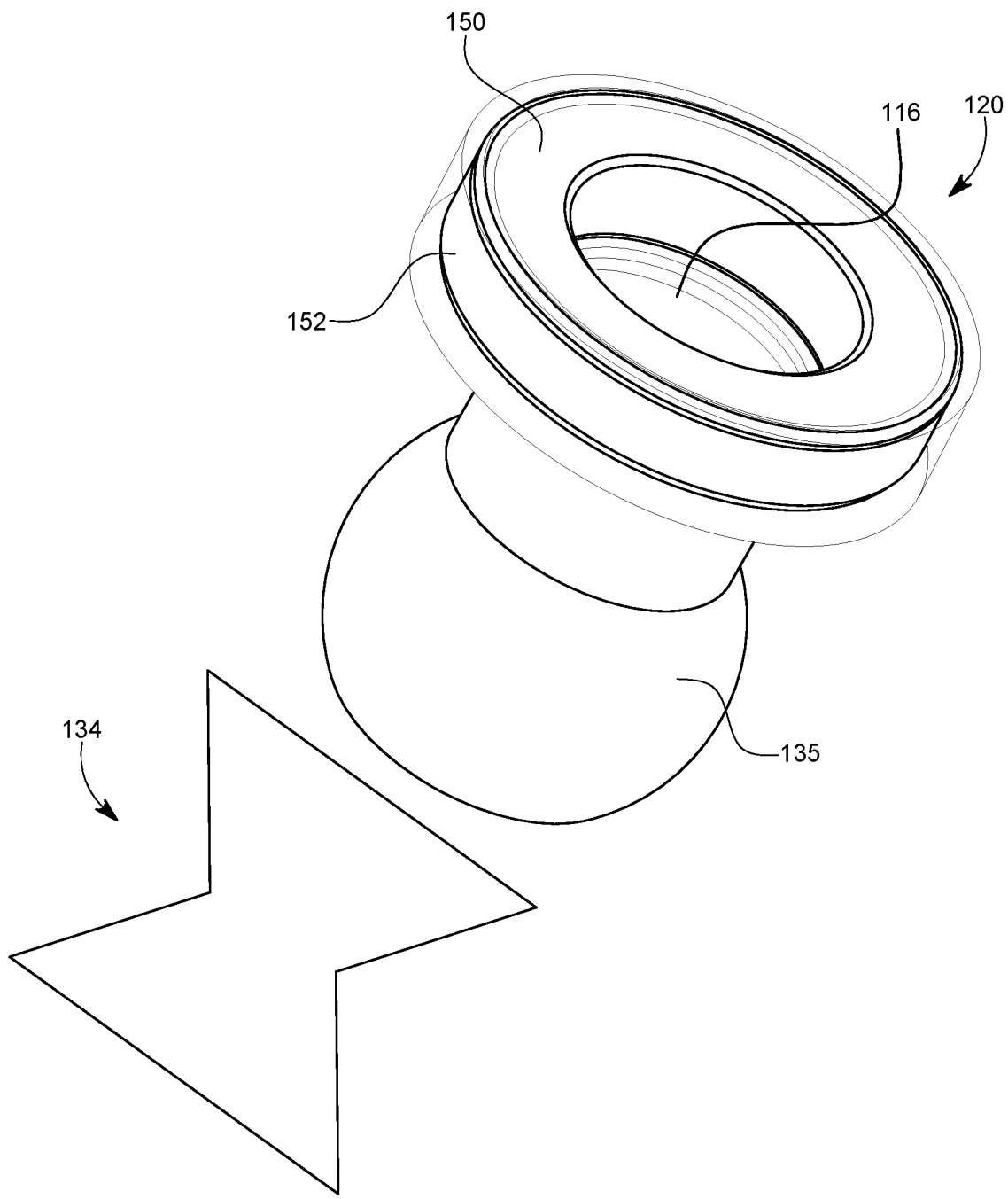
FIG. 8 is a perspective view of a port magnet post along with a conduit adapter that can be used with the nasal respiratory assembly, in accordance with some embodiments of the presently disclosed subject matter.
Figure 9:
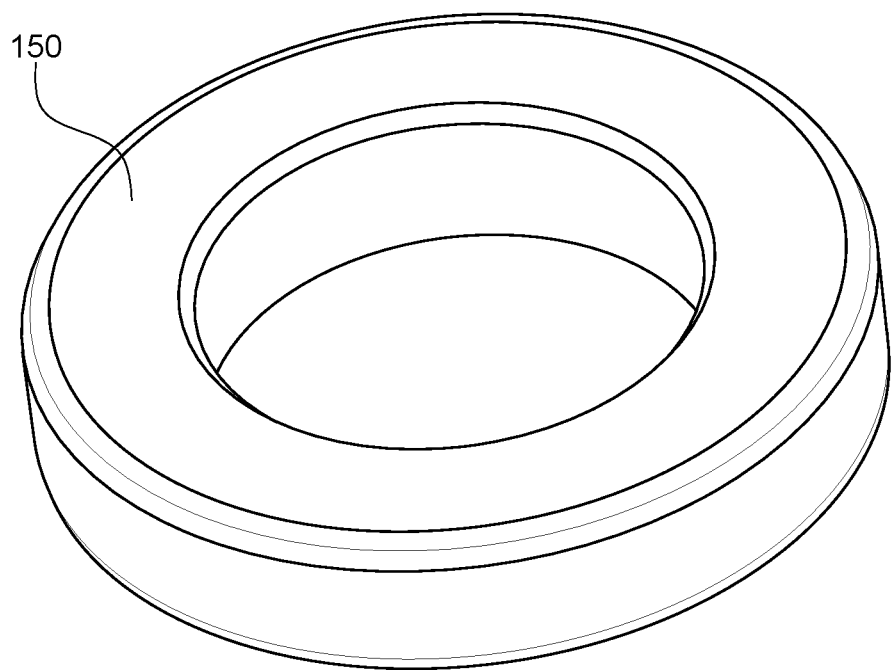
FIG. 9 is a perspective view of a magnetic ring that can be used with the nasal respiratory assembly, in accordance with some embodiments of the presently disclosed subject matter.
Figure 10:
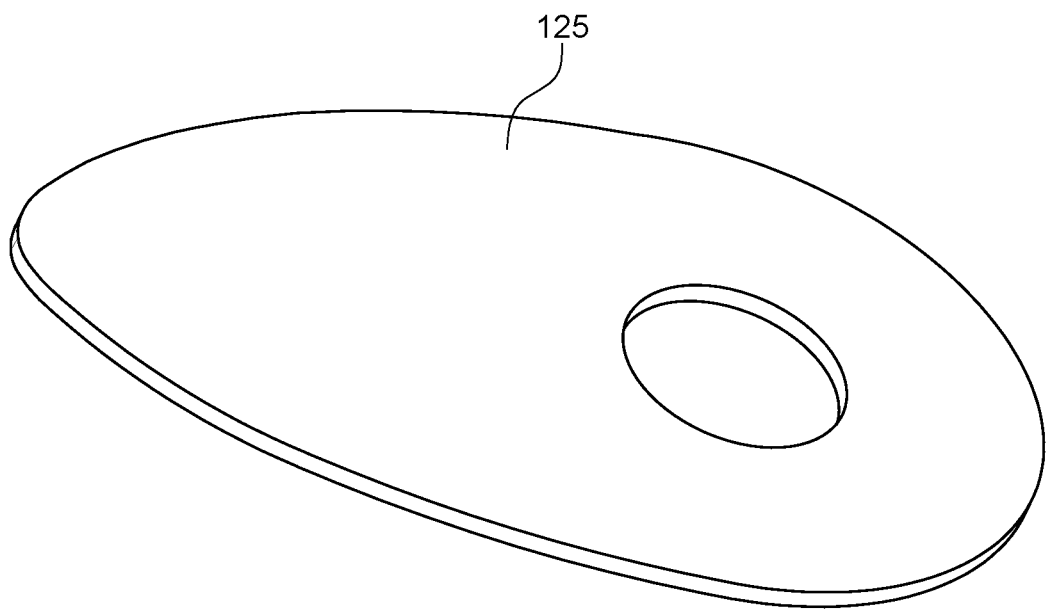
FIG. 10 is a perspective view of a sheet that can be used with the nasal respiratory assembly, in accordance with some embodiments of the presently disclosed subject matter.

FIG. 8 illustrates a port magnet post and a conduit adapter according to at least one embodiment. In various embodiments, each port magnet post 120 includes a magnetic ring 150 (e.g. in the form of a magnetic ring as shown in FIG. 8) positioned at a first end and a ball shaped receptacle 135 positioned at a second end with a passageway extending from the first to the second ends. Magnetic ring 150 illustrated in FIG. 9 removably attaches to the ferromagnetic ring 162 at exit end 116.

FIGS. 10 to 14 illustrate some alternate components of nasal respiratory assembly 105 according to one or more embodiments of the currently disclosed subject matter. Sheet 125 (illustrated in FIG. 10, for example) can be configured to a dome-shaped ferromagnetic ring 262. In some embodiments, socket magnet posts 220 are configured as nasal prongs (see magnet socket 252 in FIG. 14) that extend towards and make contact with dome-shaped ferromagnetic rings 262 of sheets 225 via magnet rings 250. Sheets 225 are configured for attaching to the nostrils of a wearer such that fluid received at inlet 238 is delivered into the nostrils of the wearer via the respective opening 217 in sheets 225.

Figure 11:
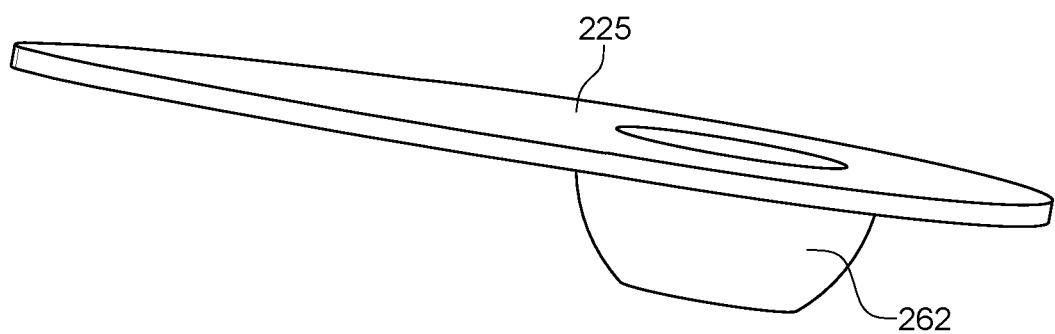
FIG. 11 is a perspective view of a dome ring and a sheet that can be used with the nasal respiratory assembly, in accordance with some embodiments of the presently disclosed subject matter.
Figure 12:
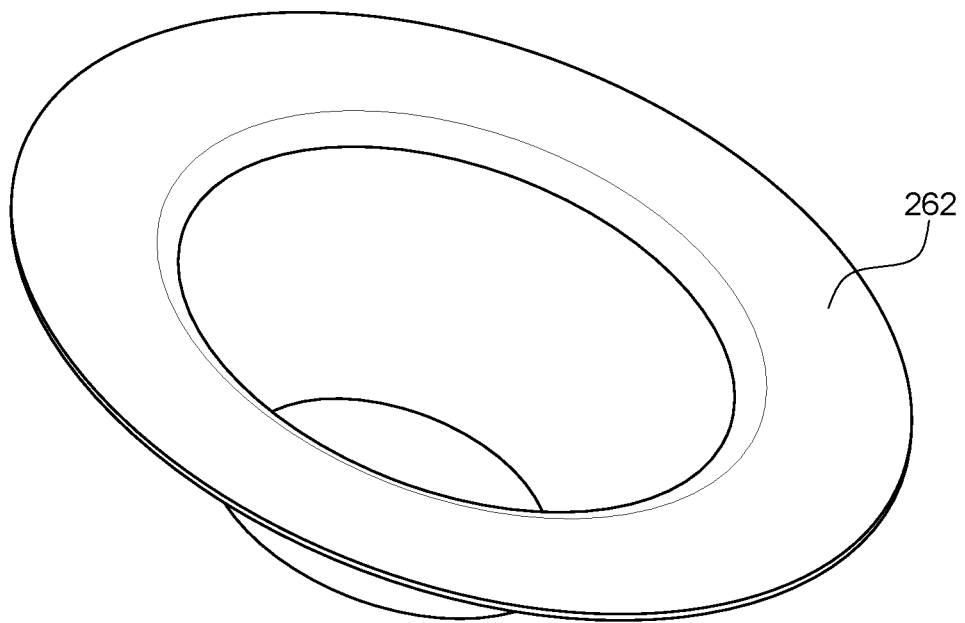
FIG. 12 is a perspective view of a dome ring that can be used with the nasal respiratory assembly, in accordance with some embodiments of the presently disclosed subject matter.
Figure 13:
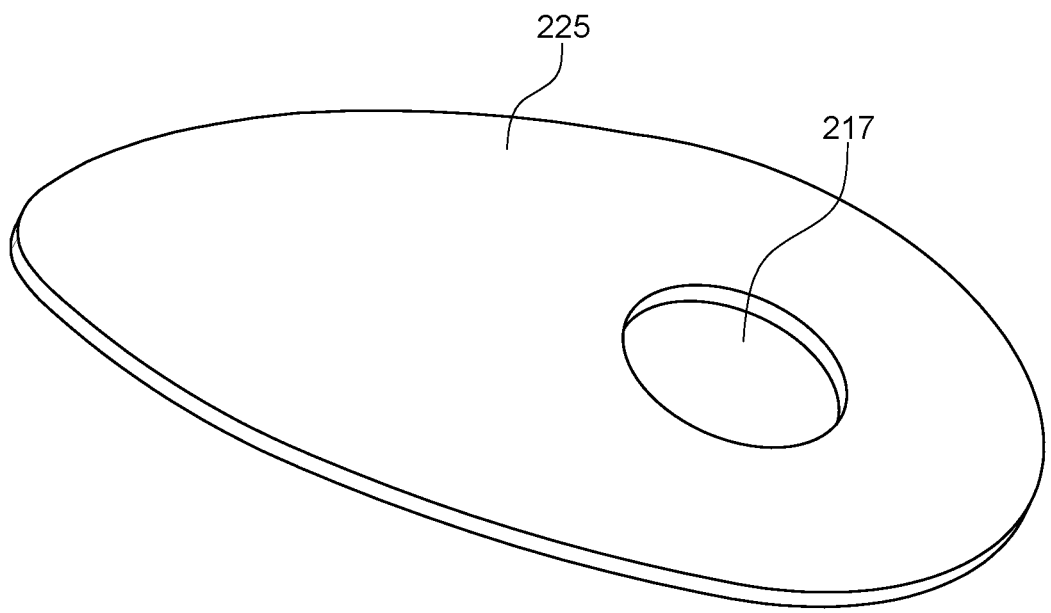
FIG. 13 is a perspective view of a sheet that can be used with the nasal respiratory assembly, in accordance with some embodiments of the presently disclosed subject matter.

In at least one embodiment, dome-shaped ferromagnetic ring 262 is made an integral component of sheet 225 (as illustrated in FIG. 11, for example) such that the openings of dome-shaped ferromagnetic ring 262 is aligned with the respecting openings 217 of sheets 225. An underside of sheet 225 accordingly includes the dome-shaped ferromagnetic ring 262 that cooperates with magnetic ring 250 to provide a continuous conduit such that fluid received at an inlet 238 is delivered into the nostrils of the wearer via the respective opening in sheet 225. When magnetic ring 250 is detachably attached to dome-shaped ferromagnetic ring 262 of sheet 225, the upper end of each socket magnet post 220, i.e., exit ends 216, are in fluid communication with the interior of the nostrils of the wearer, whereas receptacles 235 found at lower end of socket magnet post 220 are in fluid communication with the interior opening of conduit adapter 134. The interior opening of conduit adapter 134, in turn, is in fluid connection with a nasal connector such that respiratory fluid flows from exit end 216 (i.e., upper post opening) of each socket magnet post 220 and through opening 217 of each sheet 225 and into the interior of the nostrils of the wearer. Thus, each socket magnet post 220 and an associated conduit adapter 134 comprises a unique pathway for conveying fluid from a fluid source to the nasal passage of the patient.

In various embodiments, socket magnet posts 220 can have various cross-sections, such as a circular, oval or rectangular in cross-section, with opening 217 having a shape that compliments the cross-section of socket magnet posts 220. Each magnet ring 250 of socket magnet post 220 is configured to engage with dome-shaped ferromagnetic ring 262 of sheets 225, the sheets 225 in turn being configured to engage the nostrils of the patient. The nare facing side of each sheet 225 can be configured for providing a flush, sealable engagement with the patient's nares. Each sheet 225 directly contacts the exterior of a patient's nostril or the skin surrounding the patient's nostril. As shown, the interior of socket magnet post 220 includes post channel 236 passing through the entire length thereof to allow fluid flow to the nasal cavity of the patient.

Figure 14:
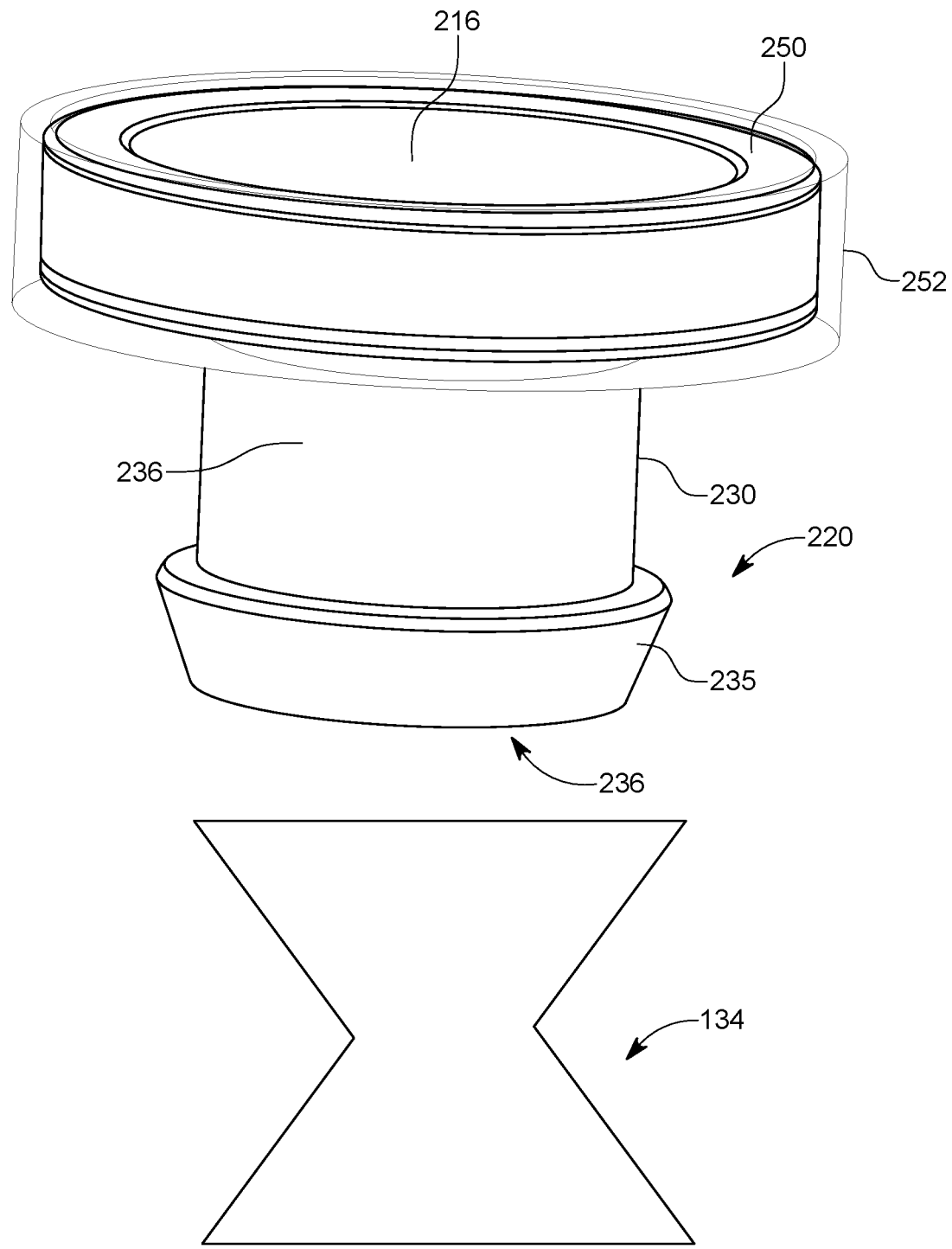
FIG. 14 is a perspective view of a socket magnet post with a conduit adapter that can be used with the nasal respiratory assembly, in accordance with some embodiments of the presently disclosed subject matter.

As shown in FIG. 14, an upper end of each socket magnet post 220 includes a magnet socket 252 configured to house a magnet such as magnetic ring 250. Socket magnet post 220 further includes post body 230, a receptacle 235 and a post channel 236. In some embodiments, socket magnet posts 220 are parallel or about parallel to each other when the nasal respiratory assembly is installed on a person. While magnetic ring 250 is shown to be ring shaped, other shapes are possible without deviating from the spirit of the presently disclosed subject matter; similarly, dome-shaped ferromagnetic ring 262 (see FIG. 12, for example) too may take other shapes such that any shape taken by dome-shaped ferromagnetic ring 262 compliments or matches the shape of magnetic ring 250. In various embodiments, dome-shaped ferromagnetic ring 262 is made of a ferromagnetic material such that it is attracted by the magnetic field of magnetic ring 250 so as to form a substantially airtight bond or attachment therewith.

Accordingly, in some embodiments, the nasal respiratory assembly can include a pair of sheets, each sheet defining an opening sized and shaped to fit over a nostril of a patient, with a dome-shaped ferromagnetic ring 262 positioned at an underside of the sheet and circumferentially aligned with the opening, with an upper side of the sheet configured for sealable engagement with the nostril. A pair of socket magnet posts 220, each socket magnet post 220 including a magnetic ring 250 positioned at a first end and a receptacle 235 positioned at a second end with a passageway extending from the first to the second ends, the magnetic ring 250 removably attachable to the dome-shaped ferromagnetic ring 262. A pair of conduit adapters 134 with openings therethrough for fluid flow, a post end socket 127 of each conduit adapter 134 including a socket (not shown), each socket shaped to receive a receptacle 235 in an interference fit to form a substantially airtight connection therewith. A connector end 128 of the conduit adapter cooperates with a channel opening 115 of a connector of a continuous positive airway pressure (CPAP) machine to form a substantially airtight connection therewith.

In some embodiments, each sheet 225 engages with or includes one or more flexible adhesive sheets (not shown) to provide sealable engagement with the patient's nostrils. Sheet can be constructed from any known material, including (but not limited to) woven fabric, plastic, and/or latex. For example, in some embodiments, sheet can be constructed from PVC, polyethylene, polyurethane, latex, or combinations thereof. In some embodiments, sheet can be a foam medical tape, a surgical tape, and/or a hypoallergenic tape. The patient contacting surface of sheet 225 can include an adhesive. The adhesive can be any medically safe adhesive known or used in the art. For example, the adhesive can be selected from one or more acrylates (such as methacrylate, alkyl acrylate, or epoxy diacrylate), acrylic acids, polyvinyl chloride, alkyl esters, or combinations thereof. In some embodiments, the adhesive is a pressure-sensitive adhesive such that the sheet can be adhered and removed from the patient's skin as desired. The adhesive can be selected to show mild or no irritation to the skin when used daily. In some embodiments, the adhesive tape can be configured as a hydrocolloid tape and/or can include a polyurethane reactive layer that adheres more to the nostril as the patient's body temperature warms up the adhesive. Alternatively, in some embodiments, the adhesive can be directly applied to the patient's nostril or the nasal engaging portion to provide a removeable connection (e.g., no sheet is used).

In various embodiments, the ferromagnetic ring may or may not have a dome shape. In some embodiments, the upper surface of socket magnet post 220 may angled. In some embodiments, magnet socket 252 positioned about a first end of socket magnet post 220 (e.g., an upper surface of socket magnet post 220) can be angled in relation to the body of socket magnet post 220 to allow for enhanced attachment to dome-shaped ferromagnetic ring 262 of sheet 225 for better positioning on a patient's nostrils. In some embodiments, the angle can be between about 0-45 degrees, such as about 5, 10, 15, 20, 25, 30, 35, 40, or 45 degrees. For example, in some embodiments, a plane parallel to a circumference, a perimeter, or a largest dimension of the magnet socket 252 can be configured to make an angle of about 0-45 degrees with a plane that is perpendicular to a vertical axis passing through the center of a bottom portion of the channel provided by port magnet post 200 that is closest to the channel openings of the nasal connector 190. As another example, in some embodiments, a plane parallel to a circumference, a perimeter, or a largest dimension of the magnet socket 252 can be configured to make an angle of about 0-45 degrees with a major lateral plane that is perpendicular to a vertical axis passing through the center of the opening provided on vent 170. In some embodiments, the angle can be created by having a portion of the post body bulge outwards at an angle. In some embodiments, the angle can be created by modifying one or more components of nasal connector 190, including the area directly beneath the channel opening of socket magnet post 220. Alternatively, in some embodiments, the body of socket magnet post 220 can remain substantially cylindrical, having a top portion cut at an angle. The body of socket magnet post 220 houses a channel within its interior to allow the flow of fluid to the nasal cavity of the patient. In some embodiments, the body can have a circular, oval, or square cross-sectional shape. However, the shape of the body is not limited and can be configured in any desired shape. Further, the channel of socket magnet post 220 can have any desired cross-sectional shape, such as square, triangular, circular, oval, and the like. According to one or more embodiments, an upper surface of the magnetic ring is angled. In such embodiments, the magnetic ring can have different thicknesses in different regions of the magnetic ring. In some embodiments, the angle can be created by modifying one or more components of conduit adapter 134, including the area directly beneath (i.e., upstream of) post end socket 127.

Post body 230 houses post channel 236 within its interior to allow the flow of fluid to the nasal cavity of the patient. In some embodiments, post body 230 can have a circular, oval or square cross-sectional shape. However, the shape of post body 230 is not limited and can be configured in any desired shape. Further, post channel 236 can have any desired cross-sectional shape, such as square, triangular, circular, oval, and the like. Magnet socket 252, magnetic ring 250 and opening 217 too can take various cross-sectional shapes. According to one or more embodiments, an upper surface of the magnetic ring is angled. In such embodiments, the magnetic ring can have different thicknesses in different regions of the magnetic ring.

The channel openings 115 of nasal respiratory assembly 105 in general, and of nasal connector 190 in particular, can be configured as sockets that releasably connect with connector end 128 of conduit adapter 134. Each such socket can include one or more releases for engaging and disengaging the connector end 128 in the form of a snap-on connector, for example. The releases can be in the form of any of the wide variety of connection mechanisms known or used in the art, including (but not limited to) snap fit, screw fit, friction fit, magnetic attraction, and the like. For example, in some embodiments, the release can be configured as one or more arms that extend from a collar end of the socket. The arms can be constructed at an angle to provide leverage when pivoting the arm, thereby enabling socket collar to be deformed away from the post positioned in a recess for easy release.

In some further embodiments, an inner portion of the space between an outer perimeter of the ferromagnetic ring 162 and the inner contour of the sheet 125 (i.e., the portion contiguous to the outer perimeter of the ferromagnetic ring 162; alternately referred to as the "inner slender portion") can include a slender, loose, extremely flexible, and forgiving thin-layer of silicone that is configured to bounce in an out relative to the slip ring or relative to the ferromagnetic ring to help accommodate movements initiated by the patient during use of the nasal respiratory assembly to reduce torque. In the same embodiments, another portion of the space between an outer perimeter of the ferromagnetic ring and the inner contour of the sheet 125 can include a silicon layer that is less slender, less flexible and thicker relative to the portion that is contiguous to the outer perimeter of the about noted inner slender portion. Such an arrangement can help further increase the comfort level for the patient wearing nasal respiratory assembly by reducing or eliminating the torque that may otherwise be felt at the nose of the patient of the assembly during use of the assembly by the patient.

As shown in FIG. 14, the upper end of socket magnet post 220 can include a magnet socket 252 configured to house a magnet such as magnetic ring 250. Socket magnet posts 220 can further include post body 230, receptacle 235 and post channel 236. In some embodiments, the socket magnet posts 220 are parallel or about parallel to each other. While magnetic ring 250 is shown to be ring shaped, other shapes are possible without deviating from the spirit of the presently disclosed subject matter; similarly, dome-shaped ferromagnetic ring 262 may take other shapes such that any shape taken by dome-shaped ferromagnetic ring 262 compliments the shape of magnetic ring 250. In various embodiments, the dome-shaped ring is made of a ferromagnetic material such that it is attracted by the magnetic field of magnetic ring 250.

Receptacle 235 of socket magnet post 220 is configured on a second post end for engaging post end socket 127 of conduit adapter 134. In some embodiments, receptacle 235 can comprise a tapered ridge. In some embodiments, post end socket 127 can be shaped to compliment the tapered ridge of receptacle 235. However, the shape of receptacle 235 is not limited, and can be constructed to enable insertion of an end thereof into post end socket 127 or otherwise enable connection of an end thereof with post end socket 127 of conduit adapter. In some embodiments, receptacle 235 can be configured to selectively engage a receiving portion of post end socket 127. The engagement of the receptacle with the post end socket can be achieved using a number of different structural configurations. For example, receptacle 235 can be a circumferentially extending portion for selectively engaging a respective recess-receiving portion of the post end socket 127. Alternatively, the receptacle can be a ball joint and the receiving portion can be a tube socket.

In some embodiments, port magnet post 120 and/or socket magnet post 220 can include one or more vents in communication with post channel 236 to ensure that the patient's ability to breathe is not hampered, and to ensure excess fluid has an outlet. The vents can be sized and shaped in any desired configuration and can be positioned proximal to any of the regions where fluid flow occurs. Thus, the vents can be positioned on the flange, body, and/or connector of the post. The vents can vary in size and location such that manipulation of all exhaled fluids (e.g., $CO_2$) is controlled and titratable to alter the flow rate to a desired setting. In some embodiments, the vents can include polymeric fibers, membranes, and/or webs with an extremely small thickness (e.g., from nanoscale to microscale).

Socket magnet post 220 (as well as port magnet post 120) can be constructed from any desired material. For example, the post can be constructed from rubber, silicone polymers, acrylate polymers, or combinations thereof. It should be appreciated that the materials used to construct post are not limited to the materials cited herein above. Socket magnet post 220 can be attached to the exterior portion of each patient nostril by affixing sheets 225 directly to the skin surrounding the nostril, and then attaching magnetic ring 250 to dome-shaped ferromagnetic ring 262. In this arrangement, post channel 236 is positioned in line with the nostril opening. In some embodiments, a further sheet comprising an adhesive can be used can be used to attach the sheet to the nostril. Thus, the adhesive side of the further sheet can be used to adhere sheet 225 to the skin of the patient. Alternatively, the adhesive can be directly applied to the patient's skin (e.g., the area surrounding the nostril). The post along with sheet 225 can be configured for providing a flush, sealable engagement with the patient's nostril. After a post has been affixed to the exterior portion of each of the patient's nostrils, channel opening 115 of nasal connector 190 can be translated towards post channel 236 at the second end of the post. Open exit ends 216 (gas-flow end) of the post is in a substantially airtight attachments with dome-shaped ferromagnetic ring 262. Fluid flows from the tubing, through the interior of the nasal connector, through the interior of conduit adapter 134, through the interior of socket magnet post 220, exits the socket magnet post 220 via exit end 216, and flows into the patient's nasal passages.

In use, sheet 225 can be attached to the exterior portion of each nostril by affixing sheet 225 directly to the skin surrounding the nostril, as set forth in detail herein above. Socket magnet post 220 in connected arrangement with a fluid source via tubing is then translated towards the sheet such that magnetic ring 250 attaches to dome-shaped ferromagnetic ring 262 of sheet 225. When a user desires to uncouple the post and sheet, magnetic ring 250 can be detached from dome-shaped ferromagnetic ring 262 by gently pulling one or more of the nasal connector, the tubing, the socket magnet post, and the vent away from the nostrils. In one embodiment, dome-shaped ferromagnetic ring 262 is itself a permanent magnet (rather than dome-shaped ferromagnetic ring 262 being formed of a material that magnet ring 250 attracts). Dome-shaped ferromagnetic ring 262 itself being a permanent magnet can advantageously operate to improve the bond between dome-shaped ferromagnetic ring 262 and magnet ring 250 in one implementation.

The remaining components of the nasal assembly including socket magnet post 220 may be substantially similar to or identical to the respective components of nasal respiratory assembly 105, with the components of the nasal assembly labeled with numerals that include a 100th place prefix "2" added to the respective components of nasal respiratory assembly 105. For example, magnetic ring 250 of the nasal assembly including socket magnet post 220 can be substantially similar or identical features as magnetic ring 150 of nasal respiratory assembly 105. As another example, vent coupling 254 of the nasal assembly including socket magnet post 220 can be substantially similar or identical features as vent coupling 154 of nasal respiratory assembly 105, and so on. Accordingly, nasal assembly including socket magnet post 220 and its various components including opening 217, magnet socket 252, sheet 225, post channel 236, socket magnet post 220 can have similar or identical features as the respective components of nasal respiratory assembly 105 arrived by replacing the 100th place prefix "1" with prefix "2" in the corresponding component of nasal respiratory assembly 105, except as otherwise explained herein.

The respiratory assembly disclosed herein has a wide variety of applications. For example, in some embodiments, the assembly can be used for high flow delivery of respirator gas via nasal assembly. In some embodiments, the air can be heated to near body temperature (e.g., about 37° C.) and/or humidified (e.g., about 100% relative humidity) to decrease airway moisture loss, airway cooling, nasal irritation, and the like. In high flow therapy, the source of oxygen is typically blended with compressed air, allowing the delivery of air, blends of air and oxygen from about 22% to about 99%, or delivery of 100% oxygen with the use of an oxygen blender. Advantageously, the disclosed assembly includes tubing large enough to deliver flow rate of respiratory gas of up to about 50 liters per minute for adults. The nasal assembly and its components are also small enough to prevent sealing of the nares, allowing flow during exhalation and allowing the escape of excess gas during inhalation. Beneficially, because the delivered flow rate can meet the inspiration flow rate, the delivered gases are not diluted by room air.

Alternatively, or in addition, the disclosed respiratory assembly can be used with a continuous positive airway pressure (CPAP) machine. CPAP machines typically apply mild air pressure on a continuous basis to keep a patient's airway continuously open. As a result, CPAP machines used in conjunction with a patient's stent can advantageously cause the lungs' alveoli to open and thus recruit more of the lung's surface area for ventilation. CPAP machines are generally used for people with breathing problems, such as sleep apnea. Alternatively, CPAP machines can be used to treat pre-term infants whose lungs have not yet fully developed. In some embodiments, the disclosed assembly can be used as a replacement for traditional CPAP masks.

The disclosed respiratory assembly can further be used in pressure recording applications in clinical settings, such as to diagnose sleep apnea or other disorders. Particularly, sleep apnea can be diagnosed based on characteristic clinical features associated with episodes of cessation of breathing that define hypopnoeic and apnoeic events. The disclosed device can be used to measure nasal pressure by measuring nasal pressure with nasal prongs connected to a pressure transducer.

The disclosed assembly can further be used with a fluid tank, a humidifier, or any other fluid source known or used in the art. Advantageously, the disclosed assembly may eliminate over-the-ear soreness and lip soreness commonly found in traditional respiratory masks and cannula. In addition, the disclosed assembly may enable better control of gases (e.g., oxygen) during fluid delivery applications. In some embodiments, the disclosed assembly is strapless and maskless, thereby increasing using comfort. As a result, patients are more likely to follow doctor's orders and use the assembly. In addition, unsightly mask and strap skin indentations are eliminated. The disclosed assembly is less likely to be dislodged inadvertently by the patient, such as during movement or when being pressed against a pillow.

In some embodiments, the disclosed respiratory assembly includes a sanitizing enclosure that can be used to sanitize the reusable portions of the CPAP assembly. The term "sanitizing" as used herein refers to the elimination of all or nearly all microbial forms. The sanitizing enclosure can include an activated oxygen and/or UV light generator that is used to clean and/or sanitize the reusable CPAP elements. For example, in some embodiments, the generator can generate activated oxygen to sanitize the contents of interior of the enclosure and the reusable CPAP system Activated oxygen (also known as 03 or ozone) is a safe, naturally-occurring gas that has been shown to kill virtually all known forms of viruses in water and air. Particularly, activated oxygen has been shown to interfere with the metabolism of bacterium cells, likely through inhibiting and blocking the operation of the enzymatic control system. A sufficient amount of activated oxygen breaks through the cell membrane, leading to destruction of the bacteria. Activated oxygen destroys viruses by diffusing through the protein coat into the nucleic acid core, resulting in damage to the viral RNA. At higher concentrations, activated oxygen destroys the viral capsid by oxidation to affect the DNA or RNA structure. Activated oxygen has been shown to be effective in destroying dozens of harmful pathogens, including *E. coli*, influenza virus, Staphlococus, *Streptococcus* bacteria, Stomatitis virus, and many more.

In some embodiments, the generator can produce activated oxygen in a concentration of about 10-500 ppm (parts per million) within the interior and/or within the disclosed system. In some embodiments, the generator can produce UV light to sanitize the contents of the interior of the enclosure and the associated CPAP equipment. To this end, the generator can include one or more ultraviolet lights that can be activated for a pre-set time period. UV light is highly effective at deactivating microorganisms, including bacteria, viruses, yeasts, and molds. In some embodiments, the UV light is in the range of about 100-280 nanometers which is known to damage the DNA molecules in bacteria, viruses, molds, yeasts, and other microorganisms, preventing them from replicating and causing harm.

The sanitizing enclosure can kill about 99% of mold, bacteria, and viruses in the CPAP user's sockets (or mask), tubing, humidifier, and CPAP chamber. In addition to being highly effective, the sanitizing enclosure is designed for ease of use. Users simply place their sockets or mask in the sanitizing enclosure, close the lid, and walk away. Importantly, no disassembly of the CPAP apparatus is required prior to start of the sanitizing process. Advantageously, the sanitizing enclosure can be used daily. In one embodiment, the sanitizing enclosure is configured to support several sanitization cycles to be carried out per day. The enclosure can be configured in any desired shape, such as circular, oval, square, triangular, oval, hexagonal, pentagonal, star, abstract, and the like. The enclosure can be configured in any desired size. In some embodiments, the enclosure can have a relatively small size, compared to the size of the CPAP assembly. For example, the enclosure can have a height, width, and depth of less than about 5 inches, such as no more than about 5.0, 4.75, 4.5, 4.25, 4.0, 3.75, 3.5, 3.25, 3.0, 2.75, 2.5, 2.25, 2.0, 1.75, 1.5, 1.25, or 1.0 inches. However, the enclosure can have any desired size to accommodate a particular CPAP element within its interior.

In various embodiments, the fluid source connected to tubing 10 (see FIG. 1) can comprise a high flow oxygen (HFO) source, and the nasal respiratory assembly 105 and other components of the assembly as described herein can be used in combination with, or comprise one or more attributes of, a high-flow nasal cannula (HFNC). Accordingly, in various embodiments, the various nasal respiratory assemblies as described herein are configured to operate in conjunction with a HFNC system designed to deliver air flow that has been humidified such as, for example, the equipment manufactured by Salter Labs (Adult High Flow Cannula 1600HF with an effective delivery of oxygen flows up to 15 LPM), Vapotherm (2000i High Flow Therapy system with a flow range up to 40 LPM with 95% to 100% relative humidity and a temperature range of 33° to 43° C.), Teleflex (Comfort Flo Humidification System with flow rates up to 40 LPM), and Fisher & Paykel Healthcare (Optiflow™ and AIRVO™ 2 devices, both of which can deliver flow rates of up to 60 L/min).

As is well-known in the relevant art, an HFO system can deliver a high-flow air/oxygen blend through a nasal respiratory assembly such as nasal respiratory assembly 105, for example, thereby providing an alternative to other forms of ventilation. By providing flow rates of up to 60 LPM, high molecular humidity, and precise oxygen delivery, an HFO system can reduce the need for noninvasive ventilation and intubation in selected patient populations. The utilization of HFO therapy via a HFNC in appropriate patients can improve oxygenation, decrease the patient's work of breathing, and serve as an alternative to more invasive forms of treatment, such as mechanical ventilation. Most of the benefits from the HFNC, besides heating and humidification come from the optimal flow. HFNC provides for a continuous flow of fresh gas at high flow rates replacing or washing out the patient's pharyngeal dead-space (the old gas low in oxygen and high in $CO_2$) whereby each breath that the patient now re-breathes will be washed out of carbon dioxide and replaced with oxygen rich gas improving breathing efficiency.

An HFO system can consist of a heated, humidified high-flow nasal cannula (HFNC) that can deliver up to 100% heated and humidified oxygen at a maximum flow of 60 LPM via nasal prongs or cannula. An air/oxygen blender can provide precise oxygen delivery independent of the patient's inspiratory flow demands. An HFO system can be utilized in a wide spectrum of patient care arenas; it can be administered to patient populations in critical care units, emergency departments, end-of-life scenarios, and in-home care environments. Improving gas exchange and decreasing work of breathing are clinical endpoints when managing patients with respiratory compromise. An HFO system can provide accurate oxygen delivery in a wide array of patient populations and treatment arenas, including when treating patients with mild to moderate hypoxemia. HFO therapy in appropriate patients can improve oxygenation and can decrease the patient's work of breathing without the need for noninvasive or invasive ventilation. In addition, it may reduce the duration of ICU stay in some patients. Humidified HFNC oxygen therapy can provide adequate oxygenation for many patients with hypoxemic respiratory failure and may be an alternative to NIV for patients who decline intubation. High-flow oxygen administration can also be utilized in the end-of-life clinical arena.

Heated and humidified oxygen has several benefits compared to standard oxygen therapy. Standard oxygen therapy delivered through a nasal cannula or another device, such as a non-rebreather mask (NRBM), delivers cold (not warmed) and dry (not humidified) gas. This cold, dry gas can lead to airway inflammation, increase airway resistance, and impair mucociliary function, possibly impairing secretion clearance. Also, a significant amount of energy is expended by individuals to both warm and humidify gas during normal breathing. Thus, heated, and humidified oxygen may improve secretion clearance, decrease airway inflammation, and decrease energy expenditure, particularly in the setting of acute respiratory failure. The use of the heated and humidified high-flow nasal cannula that is combined with an assembly as described herein can be advantageously used in the treatment of patients with respiratory failure through all age groups. In one example, the heat and humidified high-flow nasal cannula or high-flow nasal cannula (HFNC) can heat gas up to 37° C. with a 100% relative humidity, and can deliver 0.21-1.00% fraction of inspired oxygen ($FiO_2$) at flow rates of up to 60 liters (L)/min. The flow rate and $FiO_2$ can be independently titrated based on a patient's flow and $FiO_2$ requirements. A key element for clinical use of nasal oxygen at s is accordingly its effective humidification.

Various embodiments of the presently disclosed subject matter that includes a conduit adapter can be used in conjunction with a high flow oxygen (HFO) source and/or a high-flow nasal cannula (HFNC). Embodiments that include a HFO source and/or a HFNC can advantageously include various aspects of the disclosed subject matter as described earlier including socket magnet posts such as port magnet posts 120 wherein one end of each port magnet post 120 is configured to removably attach to a ferromagnetic ring 162 on sheet 125 through the presence of a magnetic field. The other end of each port magnet post 120 can be configured to engage an opening of nasal connector 190. In various embodiments that include an HFO source and/or a HFNC, each port magnet post 120 can include a magnet (e.g. in the form of a magnetic ring 150 as shown in FIG. 8) positioned at exit end 116 and a ball shaped receptacle 135 positioned at a second end with a passageway extending from the first to the second ends. The ball shaped receptacle engages post end socket 127 of conduit adapter 134. The magnetic ring 150 can removably attach to the ferromagnetic ring 162 (see FIG. 5B) at exit end 116. In one embodiment that includes an HFO source and/or a HFNC, magnetic ring 150 can be configured to pivotably move or rotate about the surface of dome-shaped ferromagnetic ring 262 in a ball and socket arrangement while continuing to maintain a substantially airtight connection at the interface between magnetic ring 150 and dome-shaped ferromagnetic ring 262.

In some embodiments that include an HFO source and/or a HFNC, the upper end of each port magnet post 120 can include a magnet socket 152 configured to house a magnet such as magnetic ring 150 (see FIG. 8, for example). In some embodiments that include an HFO source, as shown in FIG. 11, an underside of sheet 225 can include dome-shaped ferromagnetic ring 262 that cooperates with magnetic ring 150 to provide a continuous conduit such that fluid received from an HFO source at post channel 236 is delivered into the nostrils of the wearer via the respective opening in sheet 225. When magnetic ring 150 is detachably attached to dome-shaped ferromagnetic ring 262 of sheet 225, the upper end of each port magnet post 120, i.e., exit ends 216, is in fluid communication with the interior of the nostrils of the wearer. The lower ends of port magnet post 120 are in fluid communication with the interior of conduit adapter 134, and with the interior of nasal connector 190 such that respiratory fluid flows from exit end 216 (i.e., upper post opening) of each port magnet post 120 and through opening 217 of each sheet 225 and into the interior of the nostrils of the wearer. Thus, each post comprises a unique pathway for conveying fluid from a fluid source (for example, an HFO source with or without a HFNC) to the nasal passage of the patient. Magnet socket 252 is positioned about a first end of the post. In some embodiments that include an HFO source and/or a HFNC, magnet socket 252 (i.e., an upper surface of the post) can be angled in relation to post body 230 to allow for enhanced attachment to dome-shaped ferromagnetic ring 262 of sheet 225 for better positioning on the patient's nostrils. Magnet socket 252, magnetic ring 250 and opening 217 provided on sheet 225 too can take various cross-sectional shapes. According to one or more embodiments that include an HFO source and/or a HFNC, an upper surface of the magnetic ring is angled. In such embodiments that include an HFO source and/or a HFNC, the magnetic ring can have different thicknesses in different regions of the magnetic ring.

Various embodiments of the presently disclosed subject matter can further allow a user to swap back and forth between an HFO source and a regular flow continuous positive airway pressure (CPAP) source based on the preferences of the end-user of the nasal respiratory assembly as disclosed herein. For example, an end-user may use the nasal respiratory assembly with a regular flow CPAP source when the end-user is healthy, and swap the regular flow CPAP source with a HFO source when the end-user is sick or is otherwise in need of increased supply of air/oxygen.

What is claimed is:

1. A nasal respiratory assembly comprising:
   a pair of sheets, each sheet defining an opening sized and shaped to fit over a nostril of a patient, with a ferromagnetic dome-shaped ring positioned at an underside of the sheet and circumferentially aligned with the opening, with an upper side of the sheet configured for sealable engagement with the nostril,
   wherein the dome shaped ring comprises
      a flat disc portion having a first side contacting the underside of the sheet, an opposed second side, and a peripheral edge between the first side and second side,
      a dome portion having a base adjacent to the second side of the flat disc portion, an apex at an opposed end of the dome portion form the sheet and the flat disc portion, and a curving surface disposed between the base and the apex and extending from the second side of the flat disc portion to the apex of the dome portion, and
      a passage through the dome-shaped ring from a first aperture defined in the first side of the flat disc portion to a second aperture defined in the surface of the dome portion at the apex;
   a pair of posts, each post including a cylindrical magnetic ring, having a pathway therethrough, positioned at a first end and a ball shaped receptacle positioned at a second end with a passageway extending from the first to the second ends and through the pathway, the magnetic ring removably attachable to the dome-shaped ring;
   a pair of conduit adapters having an hourglass shaped exterior and defining openings therethrough for fluid flow, a post end of each conduit adapter including a socket, each socket configured to receive and secure the ball shaped receptacle of a post in a ball and socket arrangement to form a substantially airtight connection therewith;
   wherein a connector end of each conduit adapter cooperates with a channel opening of a connector of a continuous positive airway pressure (CPAP) machine to form a substantially airtight connection therewith.

2. The assembly of claim 1, wherein each ball shaped receptacle is configured to form an interference fit with the socket of the conduit adapter.

3. The assembly of claim 1, wherein the connector end of the conduit adapter encircles the channel opening of the connector to form an interference fit therewith.

4. The assembly of claim 1, wherein the channel opening of the connector stretches over and encircles the connector end of the conduit adapter to form an interference fit therewith.

5. The assembly of claim 1, wherein one or more of: an interior of the conduit adapter defines an approximate cylindrical opening, and an exterior of the conduit adapter defines an approximate hour-glass shape.

6. The assembly of claim 1, wherein the conduit adapter comprises an elastomeric material or low-density polyethylene (LDPE).

7. The assembly of claim 1, wherein the assembly lacks straps, masks, or both.

8. The assembly of claim 1, wherein a wall thickness of the conduit adapter varies along a height of the conduit adapter.

9. The assembly of claim 1, wherein a wall thickness of the conduit adapter decreases progressively moving from ends of the conduit adapter towards a mid-height section of the conduit adapter and the connector end towards a mid-height section of each conduit adapter and wherein each conduit adapter has a consistent diameter pathway disposed therethrough between the openings and from the post end to the connector end.

10. The assembly of claim 1, wherein an upper surface of the post is angled.

11. The assembly of claim 1, wherein an opening of the magnetic ring has a round, oblong, oval or tear drop shape, wherein the shape of an opening of the dome-shaped ring compliments the shape of an opening of the magnetic ring.

12. The assembly of claim 1, wherein an inlet at a vent end of the connector is in fluid communication with a flexible tubing connected to a fluid source.

13. The assembly of claim 1, wherein the connector is part of a generic off-the-shelf continuous positive airway pressure (CPAP) machine.

14. The assembly of claim 1, wherein the fluid is supplied from a high flow generator, a continuous positive airway pressure (CPAP) machine, a fluid tank, or a humidifier.

15. A nasal respiratory assembly comprising:
   a pair of sheets, each sheet defining an opening sized and shaped to fit over a nostril of a patient, with a ferromagnetic ring positioned at an underside of the sheet and circumferentially aligned with the opening having a passage in fluid communication with the opening, with an upper side of the sheet configured for sealable engagement with the nostril,
      wherein the ferromagnetic ring comprises a flat disc having a first side contacting the underside of the sheet, an opposed flat second side and a peripheral edge between the first side the second side, and
      wherein the passage extends through the ferromagnetic ring from the first side to the second side;

a pair of posts, each post including a cylindrical magnetic ring, having a pathway therethrough, positioned at a first end and a receptacle positioned at a second end with a passageway extending from the first to the second ends and through the pathway, the magnetic ring removably attachable to the ferromagnetic ring;

a pair of conduit adapters having an hourglass shaped exterior and defining openings therethrough for fluid flow, a post end of each conduit adapter including a socket, each socket shaped to receive the receptacle in an interference fit to form a substantially airtight connection therewith;

wherein a connector end of each conduit adapter cooperates with a channel opening of a connector of a continuous positive airway pressure (CPAP) machine to form a substantially airtight connection therewith; and wherein a wall thickness of each conduit adapter decreases progressively moving from both the post end and the connector end towards a mid-height section of each conduit adapter and wherein each conduit adapter has a consistent diameter pathway disposed therethrough between the openings and from the post end to the connector end.

16. The assembly of claim 15, wherein an interior of the conduit adapter defines an approximate cylindrical opening.

17. The assembly of claim 15, wherein the conduit adapter comprises an elastomeric material.

18. The assembly of claim 15, wherein the assembly lacks straps, masks, or both.

19. The assembly of claim 15, wherein an opening of the magnetic ring has a round, oblong, oval or tear drop shape, wherein the shape of an opening of the ferromagnetic ring compliments the shape of an opening of the magnetic ring.

* * * * *